(12) United States Patent
Moore et al.

(10) Patent No.: US 11,817,789 B2
(45) Date of Patent: Nov. 14, 2023

(54) METHOD AND APPARATUS FOR CONTINUOUS CONDUCTION MODE OPERATION OF A MULTI-OUTPUT POWER CONVERTER

(71) Applicant: POWER INTEGRATIONS, INC., San Jose, CA (US)

(72) Inventors: Karl Moore, Ely (GB); Antonius Jacobus Johannes Werner, Cambridge (GB)

(73) Assignee: POWER INTEGRATIONS, INC., San Jose, CA (US)

( * ) Notice: Subject to any disclaimer, the term of this patent is extended or adjusted under 35 U.S.C. 154(b) by 52 days.

(21) Appl. No.: 17/384,499

(22) Filed: Jul. 23, 2021

(65) Prior Publication Data

US 2021/0351711 A1 Nov. 11, 2021

Related U.S. Application Data

(62) Division of application No. 16/369,318, filed on Mar. 29, 2019, now Pat. No. 11,108,331.

(51) Int. Cl.
*H02M 3/335* (2006.01)
*H05B 45/37* (2020.01)
*H02M 1/08* (2006.01)
*H02M 1/00* (2006.01)

(52) U.S. Cl.
CPC ......... *H02M 3/33576* (2013.01); *H02M 1/08* (2013.01); *H05B 45/37* (2020.01); *H02M 1/009* (2021.05)

(58) Field of Classification Search
None
See application file for complete search history.

(56) References Cited

U.S. PATENT DOCUMENTS 5,410,467 A * 4/1995 Smith ............... H02M 3/33576
363/16
5,923,547 A * 7/1999 Mao .................. H02M 3/33573
363/52
6,127,746 A 10/2000 Clemente
(Continued)

FOREIGN PATENT DOCUMENTS

CN 105158580 A 12/2015
CN 106533214 A 3/2017
(Continued)

OTHER PUBLICATIONS

PCT Application No. PCT/US2020/024403, International Search Report and Written Opinion of the International Searching Authority; dated Jul. 8, 2020, 13 pages.
(Continued)

*Primary Examiner* — Crystal L Hammond
(74) *Attorney, Agent, or Firm* — Brian H. Floyd

(57) ABSTRACT

Methods and apparatus for continuous conduction mode operation in multi-output power converters are described herein. During a switching cycle, secondary current may be delivered via a diode to a secondary output. Prior to beginning a subsequent switching cycle, a diverting current may be provided to a lower voltage secondary output on a parallel path. In this way diode current may be reduced to substantially zero prior to the subsequent switching cycle.

27 Claims, 12 Drawing Sheets

(56) References Cited

U.S. PATENT DOCUMENTS

| | | | |
|---|---|---|---|
| 6,304,461 | B1 | 10/2001 | Walker |
| 6,434,026 | B1 | 8/2002 | Malik et al. |
| 6,504,267 | B1 | 1/2003 | Giannopoulos |
| 7,679,937 | B2 | 3/2010 | Wingrove et al. |
| 7,923,943 | B2 | 4/2011 | Peker et al. |
| 10,218,282 | B1 | 2/2019 | Moore et al. |
| 2002/0001203 | A1* | 1/2002 | Jitaru ............... H02M 3/3376 363/17 |
| 2003/0086279 | A1 | 5/2003 | Bourdillon |
| 2003/0174522 | A1* | 9/2003 | Xu ............... H02M 3/33592 363/22 |
| 2004/0046536 | A1 | 3/2004 | Librizzi |
| 2005/0226009 | A1* | 10/2005 | Jitaru ............... H02M 3/33573 363/17 |
| 2007/0121350 | A1 | 5/2007 | Duvnjak |
| 2009/0212758 | A1 | 8/2009 | Asinovski et al. |
| 2009/0322257 | A1* | 12/2009 | Kim ............... H02M 3/33561 315/308 |
| 2011/0051469 | A1 | 3/2011 | Cyr |
| 2013/0088078 | A1 | 4/2013 | Shteynberg et al. |
| 2015/0002042 | A1 | 1/2015 | Kim et al. |
| 2015/0015071 | A1 | 1/2015 | Deboy |
| 2016/0359420 | A1 | 12/2016 | Chen |
| 2016/0365794 | A1 | 12/2016 | Lawson et al. |
| 2018/0351463 | A1 | 12/2018 | Werner et al. |

FOREIGN PATENT DOCUMENTS

| | | |
|---|---|---|
| CN | 108713286 A | 10/2018 |
| CN | 108811261 A | 11/2018 |
| JP | 5978323 B2 | 7/2016 |
| JP | 2020-198720 A | 12/2020 |
| TW | 201417472 A | 5/2014 |
| TW | 201717532 A | 5/2017 |

OTHER PUBLICATIONS

Taiwan Office Action; Application No. 109110579; dated Oct. 5, 2022; 8 pages.
Machine Translation of Taiwan Office Action; Application No. 109110579; dated Oct. 5, 2022; 8 pages.
Indian Examination Report; Application No. 202117043734; dated Nov. 17, 2022; 6 pages.
Japanese Notice of Reasons for Refusal; Application No. 2021-557601; dated Jan. 31, 2023; 2 pages.
Machine Translation of Japanese Notice of Reasons for Refusal; Application No. 2021-557601; dated Jan. 31, 2023; 2 pages.
Communication pursuant to Article 94(3) EPC; European Application No. 20719871.4; dated Mar. 10, 2023; 5 pages.

* cited by examiner

METHOD AND APPARATUS FOR CONTINUOUS CONDUCTION MODE OPERATION OF A MULTI-OUTPUT POWER CONVERTER

CROSS-REFERENCE TO RELATED APPLICATIONS

This application is a divisional of U.S. patent application Ser. No. 16/369,318, filed on Mar. 29, 2019, now pending, which is hereby incorporated by reference in its entirety.

FIELD OF THE DISCLOSURE

The present invention relates to reducing diode reverse recovery current in a multi-output power converter and more particularly to reducing diode reverse recovery current during continuous conduction mode (CCM) in a multi-output power converter system.

BACKGROUND INFORMATION

Many electronic devices, such as cell phones, laptops, etc., are powered by direct current (dc) power derived from a power supply. Conventional wall outlets generally deliver a high voltage alternating current (ac) power that needs to be converted to regulated dc power in order to be used as a power source for consumer electronic devices. Switch mode power converters, also referred to as switch mode power supplies (SMPSs), are commonly used due to their high efficiency, small size, and low weight to convert a high voltage ac power to a regulated dc power.

Many electronic devices have multiple loads and require more than one dc power source in order to operate. For instance, an audio electronic device may have system components which operate at five volts and audio components which operate between twelve and twenty volts. In these applications a multi-output power converter converts ac power to multiple dc power outputs to provide regulated dc power to each of the multiple loads, namely the system components and the audio components. In some applications the regulated dc power outputs are regulated constant current (CC) outputs and/or regulated constant voltage (CV) outputs.

BRIEF DESCRIPTION OF THE DRAWINGS

Non-limiting and non-exhaustive embodiments of continuous conduction mode operation in multi-output power converters are described with reference to the following figures, wherein like reference numerals refer to like parts throughout the various views unless otherwise specified.

Figure 1A:
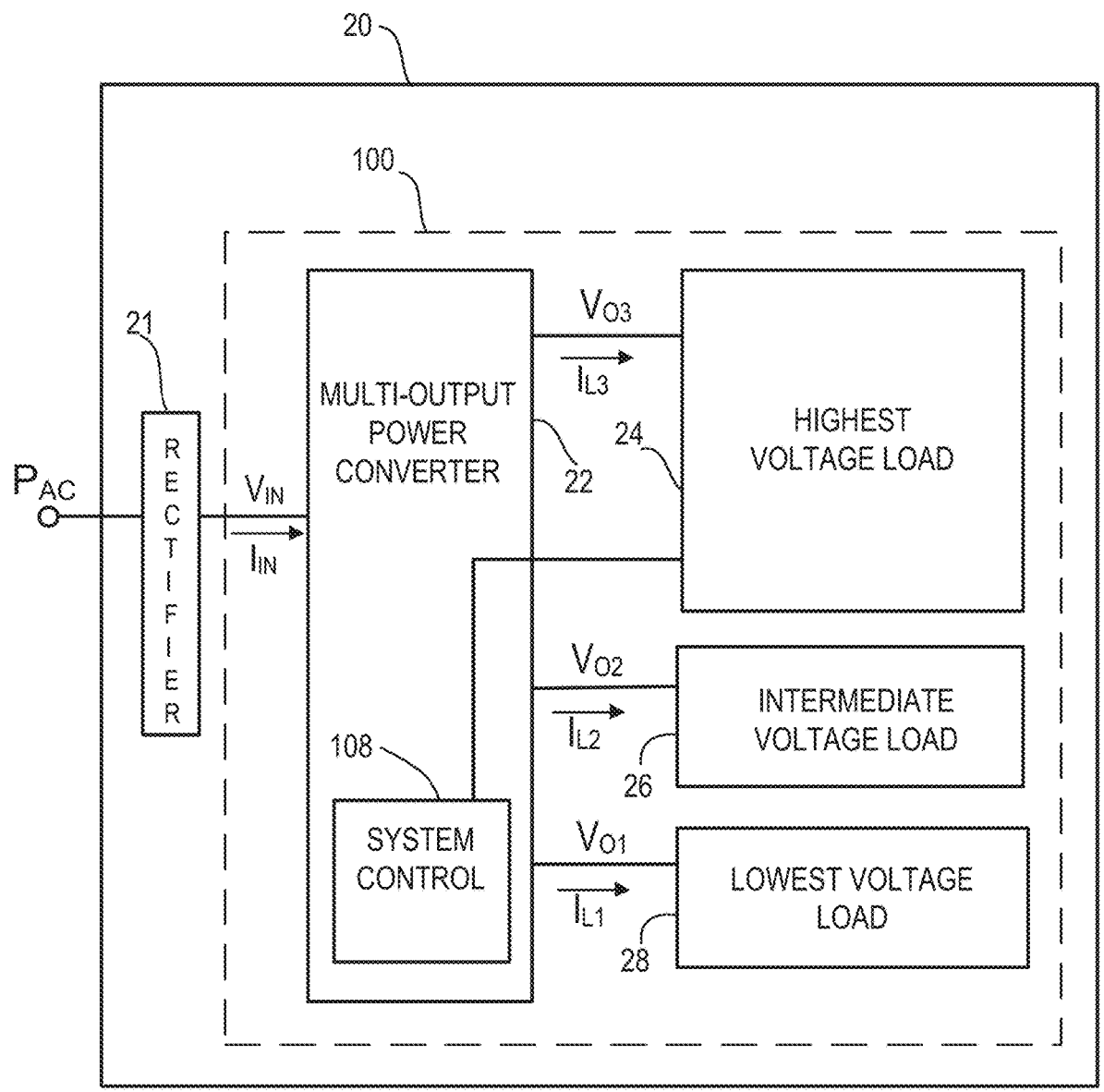
FIG. 1A illustrates an application product including a multi-output power converter system according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the teachings herein. Also, common but well-understood elements that are useful or necessary in a commercially feasible embodiment are often not depicted in order to facilitate a less obstructed view of these various embodiments of continuous conduction mode operation in multi-output power converters.

DETAILED DESCRIPTION

In the following description, numerous specific details are set forth in order to provide a thorough understanding of continuous conduction mode operation in multi-output power converters. It will be apparent, however, to one having ordinary skill in the art that the specific detail need not be employed to practice the teachings herein. In other instances, well-known materials or methods have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment of continuous conduction mode operation in multi-output switch-mode power converter systems. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

In the context of the present application, when a transistor is in an "off-state" or "off" the transistor blocks current and/or does not substantially conduct current. Conversely, when a transistor is in an "on-state" or "on" the transistor is able to substantially conduct current. By way of example, in one embodiment, a high-voltage transistor comprises an N-channel metal-oxide-semiconductor (NMOS) field-effect transistor (FET) with the high-voltage being supported between the first terminal, a drain, and the second terminal, a source. In some embodiments an integrated controller circuit may be used to drive a power switch when regulating energy provided to a load. Also, for purposes of this disclosure, "ground" or "ground potential" refers to a reference voltage or potential against which all other voltages or potentials of an electronic circuit or Integrated circuit (IC) are defined or measured.

As mentioned above, a multi-output power converter may be used to provide regulated dc power to multiple loads. The loads can be passive and/or active loads including discrete semiconductor devices, microprocessors, controllers, mixed signal circuit components, and the like. In providing regulated dc power, the multi-output power converter may regulate output current to a constant current (CC) output and/or regulate output voltage to a constant voltage (CV) output. Additionally, system voltages may be defined relative to how the multi-output power converter provides power. For instance, a multi-output power converter may provide a CC output operating at approximately forty volts, a CV output regulated to twelve volts, a CC output operating at approximately seven volts, and a CV output regulated to three volts. Relatively, the CC output operating at approximately forty volts may be referred to as having a "highest" voltage; and the three volt CV output may be referred to as having a "lowest" voltage. Additionally, the twelve volt CV output and the CC output operating at approximately seven volts may each be referred to as having an "intermediate" voltage.

As will be further described herein, power may be transferred via an energy transfer device (e.g., a transformer) from a primary side to a secondary side according to a switching cycle. For instance, a primary switch may switch according to a switching cycle whereby a primary winding receives input power for part of the switching cycle and one or more secondary windings provide power for another part of the switching cycle. When power is transferred such that current in a secondary side winding (i.e., a secondary winding current) reduces to substantially zero before the completion of a switching cycle, then the mode of operation may be referred to as discontinuous conduction mode (DCM). However, when power is transferred such that a new cycle begins before the secondary winding current reaches zero, then the mode of operation may be referred to as continuous conduction mode (CCM).

Also, as will be further described herein, multi-output power converters may provide current via diodes. Multi-output power converters may be operated in DCM to prevent reverse recovery current associated with the diodes. However, modern multi-output power converters and customer demands may necessitate operating a multi-output power converter in CCM. Unfortunately, reverse recovery current may cause unwanted power loss, unwanted current spikes in primary current waveforms, and may cause switching malfunctions. Accordingly, there is a need to mitigate reverse recovery current during CCM.

Methods and apparatus for continuous conduction mode operation in multi-output power converters are described herein. During a switching cycle, secondary current may be delivered via a diode to a secondary output (e.g., a highest voltage secondary output). Prior to beginning a subsequent switching cycle, a diverting current may be provided to a lower voltage secondary output on a parallel path. In this way diode current may be reduced to substantially zero prior to the subsequent switching cycle while operating in CCM.

FIG. 1A illustrates an application product 20 including a multi-output power converter system 100 according to an embodiment. The multi-output power converter system 100 includes a multi-output power converter 22, a highest voltage load 24, an intermediate voltage load 26, and a lowest voltage load 28. By way of example application product 20 can be a television; and the highest voltage load 24, the intermediate voltage load 26, and the lowest voltage load 28 may include a display operating at forty volts, a speaker operating at twelve volts, and microprocessor operating at five volts, respectively. In other applications the highest voltage load 24 may operate between twenty volts and one hundred volts; and the intermediate load 26 and/or the lowest voltage load 28 may operate between five volts and twenty volts. As shown, the application product 20 may also receive alternating current (ac) "mains" input power PAC and may use an optional rectifier 21 to convert the ac power into a rectified ac line input voltage $V_{IN}$ and line current $I_{IN}$. The multi-output power converter 22 can receive the rectified ac line input voltage $V_{IN}$ (and line current $T_{IN}$) and deliver multiple output voltages $V_{O1}$-$V_{O3}$ and load currents $I_{L1}$-$I_{L3}$ to the lowest voltage load 28, the intermediate voltage load 26, and the highest voltage load 24. Additionally, in the steady state the multi-output power converter 22 can regulate one or more of the multiple output voltages $V_{O1}$-$V_{O3}$ and/or load currents $I_{L1}$-$I_{L3}$.

In the teachings herein, when the multi-output power converter system 100 regulates an output voltage (e.g., one or more of the multiple output voltages $V_{O1}$-$V_{O3}$) to be constant in the steady state, the output may be referred to as a constant voltage (CV) output. Also, when the multi-output power converter system 100 regulates a load current (e.g., one or more of the load currents $I_{L1}$-$I_{L3}$) to be constant in the steady state, the output may be referred to as a constant current (CC) output. Additionally, although the multi-output power converter system 100 has three multiple outputs, configurations having greater or fewer multiple outputs are possible.

The multi-output power converter system 100 can be realized with a switch-mode power converter including an energy transfer element, such as a transformer, tailored for multiple outputs. For instance, a switch-mode power converter can be implemented in a forward converter topology and/or in a flyback converter topology with a transformer having a multi-output secondary. In the steady state, power may be transferred from the primary to the secondary, and the multiple outputs may be independently regulated by a controller and/or system control module 108. In some configurations the controller and/or system control module 108 may receive power from a CV output of the multi-output secondary; and the controller may use feedback loops (i.e., control loops) configured to regulate CC and/or CV (CC/CV) outputs.

Figure 1B:
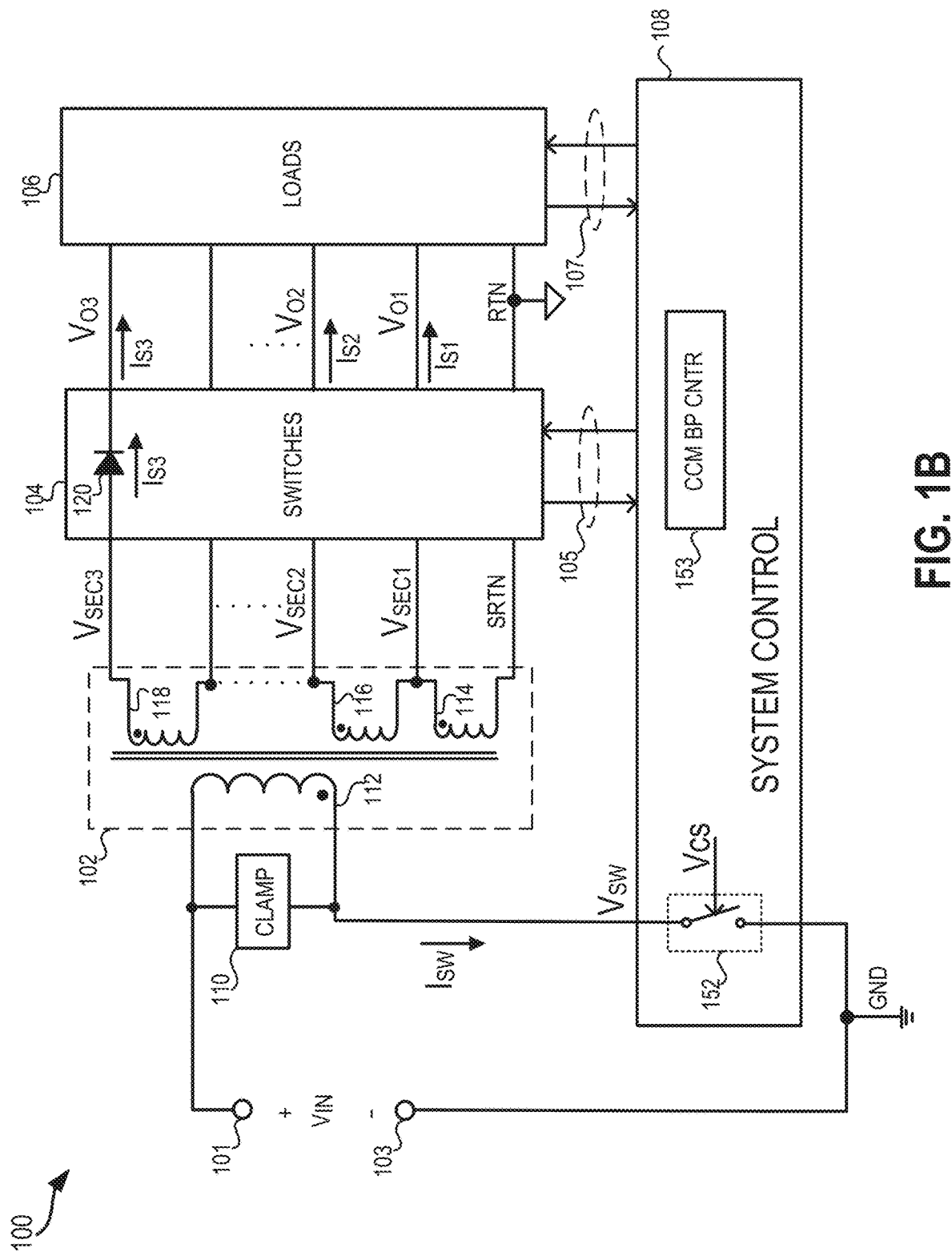
FIG. 1B illustrates a multi-output power converter system according to an embodiment.

FIG. 1B illustrates a multi-output power converter system 100 according to an embodiment. The multi-output power converter system 100 includes a transformer 102, a secondary switches block 104, multiple loads 106, a system control module 108, and a clamp 110. The transformer 102 includes a primary winding 112 and multiple secondary windings 114, 116, 118. The secondary switches block 104 includes a diode 120; also, the system control module 108 includes a primary switch 152 and a continuous conduction mode (CCM) bypass (BP) control block 153.

As illustrated the primary winding 112 and the primary switch 152 can be series coupled between input terminals 101, 103 to receive rectified ac line voltage $V_{IN}$. System control module 108 may control (i.e., switch) primary current $I_{SW}$ in the primary winding 112 with primary control signal $V_{CS}$ relative to a primary ground GND; and primary control signal $V_{CS}$ can gate (i.e., switch) the primary switch 152 so that power transfers from the primary winding 112 to one or more of the multiple secondary windings 114, 116, 118. The clamp 110 may be connected in parallel with the primary winding 112 to limit (i.e., clamp) the switch voltage $V_{SW}$. Also as illustrated, the secondary windings 114, 116, 118 may be electrically coupled with the secondary switches block 104 to provide secondary winding voltages $V_{SEC1}$-$V_{SEC3}$ relative to a secondary return potential SRTN.

The multi-output power converter system 100 may convert input power associated with the rectified ac line voltage $V_{IN}$ into multiple output voltages $V_{O1}$-$V_{O3}$, relative to a secondary ground RTN, and may provide secondary currents $I_{S1}$-$I_{S3}$. System control module 108 may be electrically coupled with the secondary switches block 104 to transmit and receive secondary switch signals 105 and also coupled with the multiple loads 106 to transmit and receive load feedback signals 107. Additionally, the system control module 108 can regulate one or more of the multiple output voltages $V_{O1}$-$V_{O3}$ and/or secondary currents $I_{S1}$-$I_{S3}$ by providing secondary switch signals 105.

Although the multi-output power converter system 100 illustrates a switch-mode configuration (i.e., a flyback configuration) for providing multiple outputs $V_{O1}$-$V_{O3}$ with corresponding secondary currents $I_{S1}$-$I_{S3}$, other configurations with greater or fewer multiple outputs are possible. For instance, the teachings herein may also be applicable to forward converters and/or other converter topologies using transformers having multiple secondary windings. Also, as one of ordinary skill in the art can appreciate, transformers with multiple secondary windings may be arranged in any coupling combination of series (i.e., stacked) windings, parallel windings, or both series windings and parallel windings with a common return line for all of the independently controlled and regulated outputs.

The multi-output power converter system 100 may provide current (e.g. secondary current $I_{S3}$) via one or more diodes (e.g., diode 120). For instance, diode 120 is electrically coupled between secondary winding 118 and the multiple loads 106 to provide secondary current $I_{S3}$. According to the teachings herein, the current in diode 120 (i.e., secondary current $I_{S3}$) may be controlled so that reverse recovery current of diode 120 is substantially reduced and/or eliminated during CCM. Additionally, the system control module 108 may use the CCM bypass control block 153 to control the secondary switches block 104 so that some or all of secondary current $I_{S3}$ is diverted (i.e., bypassed) with a diverting current (e.g., any one of secondary currents $I_{S1}$-$I_{S2}$).

Figure 2A:
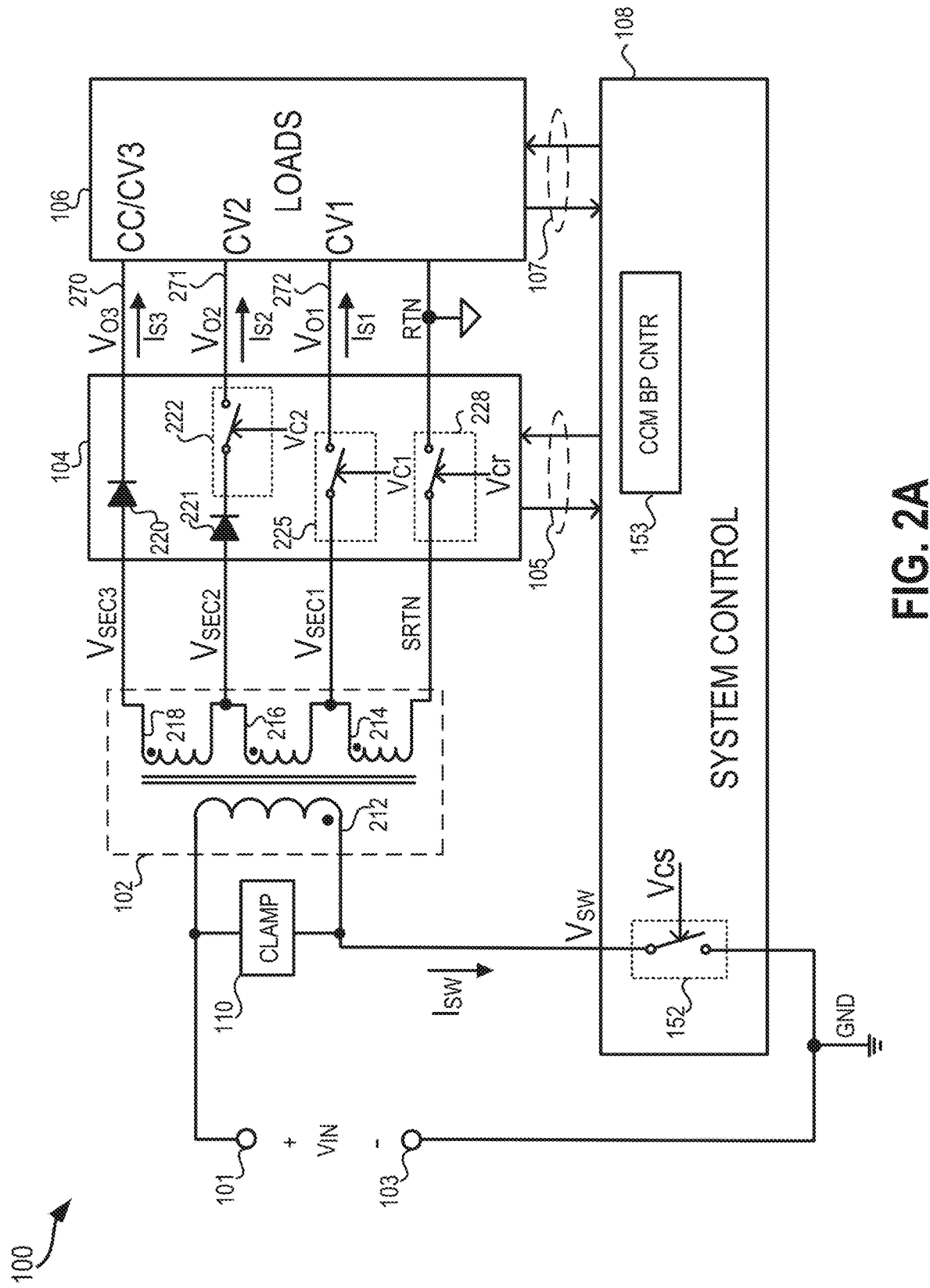
FIG. 2A illustrates a system block diagram of a multi-output power converter system for providing regulated power to CC and CV outputs according to an embodiment.

FIG. 2A illustrates a system block diagram of a multi-output power converter system 100 for providing regulated power to CC and CV outputs according to an embodiment. The transformer 102 includes primary winding 212 and multiple series-connected secondary windings 214, 216, 218 for transferring rectified ac power to the secondary switches block 104. The secondary switches block 104 can receive secondary voltages $V_{SEC1}$-$V_{SEC3}$ relative to the secondary return potential SRTN and can provide the multiple output voltages $V_{O1}$-$V_{O3}$ and corresponding load currents $I_{S1}$-$I_{S3}$ to the multiple loads 106 relative to the secondary ground RTN.

The secondary switches block 104 includes diodes 220, 221 and secondary switches 222, 225, 228. The diode 220 is electrically coupled to the secondary winding 218 to receive the secondary voltage $V_{SEC3}$ and to provide secondary current $I_{S3}$ to a CC/CV3 port (e.g., a CC output and/or a CV output) of the multiple loads 106. The CC/CV3 port indicates the highest voltage load which may be either a CC output and/or a CV output. Also as illustrated, diode 221 and secondary switch 222 are electrically coupled to the secondary winding 216 to receive the secondary voltage $V_{SEC2}$ and to provide secondary current $I_{S2}$ to a CV2 port (i.e., a CV output) of the multiple loads 106; and the secondary switch 225 is electrically coupled to the secondary winding 214 to receive the secondary voltage $V_{SEC1}$ and to provide secondary current $I_{S1}$ to a CV1 port (i.e., a CV output) of the multiple loads 106. The secondary switch 228 can provide the return path from the secondary ground RTN to the transformer secondary return potential SRTN.

The system control module 108 may provide a primary control signal $V_{CS}$ to gate (i.e., switch) the primary switch 152 with a pulse width modulated (PWM) signal. The PWM signal may be characterized by a switching cycle such that the primary switch 152 turns on and off according to the switching cycle. During switching cycles, the clamp 110 can be used to clamp a peak value of the switch voltage $V_{SW}$; and PWM control of the primary switch 152 may allow energy to transfer from the primary winding 212 to the secondary windings 214, 216, 218. Also, the system control module 108 can provide a gate control signal Vcr to secondary switch 228 to control current flow from the secondary ground RTN through the secondary windings 214, 216, 218.

As illustrated, the system control module 108 may control one or more of the multiple output voltages $V_{O1}$-$V_{O3}$ and/or secondary currents $I_{S1}$-$I_{S3}$ through secondary switch signals 105. For instance, the system control module 108 may communicate with the secondary switches block 104 in response to the load feedback signals 107 and may provide control signals $V_{C1}$ and $V_{C2}$ to control secondary switch 225 and secondary switch 222, respectively. Control signal $V_{C1}$ can be used to provide gating signals to secondary switch 225 to regulate the output voltage $V_{O1}$ (i.e., the CV1 output); and control signal $V_{C2}$ can be used to provide gating signals to secondary switch 222 to regulate the output voltage $V_{O1}$ (i.e., the CV2 output).

Additionally, the system control module 108 may provide control according to the switching cycle. For instance, during a switching cycle, the CV1 output may demand more power than the CV2 output. In response, the system control module 108 may provide control signals $V_{C1}$ and $V_{C2}$ to close secondary switch 225 and open secondary switch 222. In this way power may be provided during a switching cycle to meet the greater load demand at the CV1 output.

According to the teachings herein, the system control module 108 may also mitigate reverse recovery current in diode 220 by diverting some and/or all of the secondary current $I_{S3}$ through a parallel path. For instance, during a switching cycle when control signals $V_{C1}$, $V_{C2}$ are provided to open both secondary switches 222 and 225, diode 220 may conduct secondary current $I_{S3}$ to the CC/CV3 output along a path 270. During a CCM switching cycle, the system control module 108 may divert (i.e., bypass) current $I_{S3}$ by turning on one or both of the secondary switches 222 and 225 to effectuate a parallel path. For instance, the CCM bypass control block 153 may operate during CCM to provide control signal $V_{C1}$ to close secondary switch 225 for a portion (i.e., a portion or interval of time) of a CCM switching cycle. In this way the parallel path 272 to the CV1 output may allow secondary current $I_{S1}$ to divert some and/or all of secondary current $I_{S3}$. Accordingly, the secondary current $I_{S1}$ (i.e., a diverting current) bypasses the secondary current $I_{S3}$ (i.e., the diode 220 current) on a parallel path 272. Alternatively and additionally, the CCM bypass control block 153 may operate during CCM to provide control signal $V_{C2}$ to close secondary switch 222 for a portion (i.e., a portion or interval of time) of a CCM switching cycle. In this way the parallel path 271 to the CV2 output may allow secondary current $I_{S2}$ to divert some and/or all of secondary current $I_{S3}$. Accordingly, the secondary current $I_{S2}$ (i.e., a diverting current) bypasses the secondary current $I_{S3}$ (i.e., the diode 220 current) on a parallel path 271.

Figure 2B:
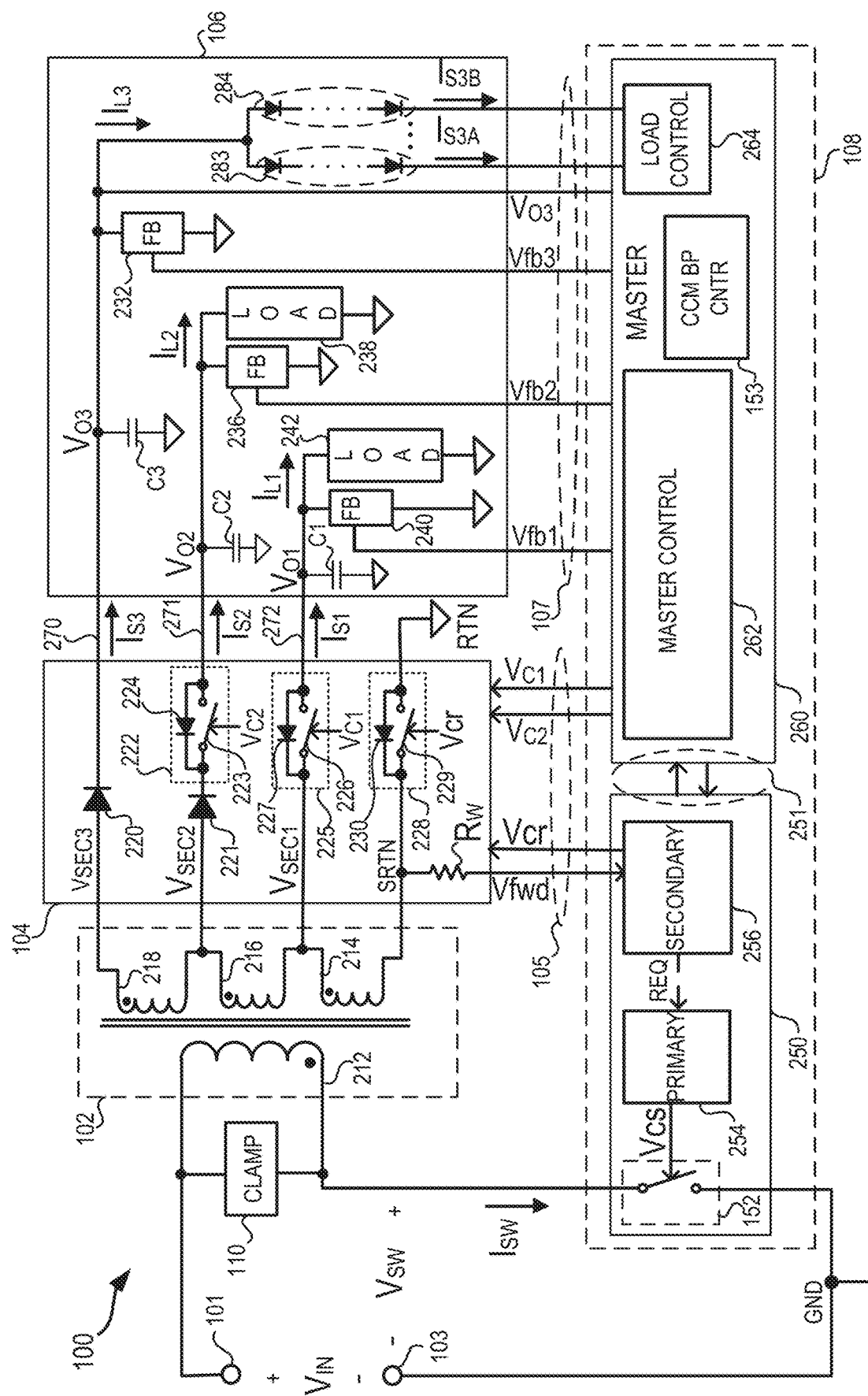
FIG. 2B illustrates a system block diagram of the multi-output power converter system for providing regulated power to CC and CV outputs according to an embodiment.

FIG. 2B illustrates a system level diagram of the multi-output power converter system 100 for providing regulated power to CC and CV outputs according to an embodiment. The multiple loads 106 include multiple parallel-connected light emitting diode (LED) strings 283-284, a first load 242, and a second load 238. As illustrated, the LED strings 283-284 demand (i.e., receive) a load current $I_{L3}$; and the first and second loads 242, 238 demand load currents $I_{L1}$, $I_{L2}$, respectively.

The multiple loads 106 include feedback networks 240, 236, 232 which can respectively provide feedback signals Vfb1, Vfb2, Vfb3 to the system control module 108. Additionally, the multiple loads 106 include filter capacitors C1-C3 electrically coupled to the first load 242, second load 238, and the LED strings 283-284, respectively. In the steady state the multi-output power converter system 100 of FIG. 2B can be configured to regulate the power delivered to the LED strings 283-284 as a CC output (i.e., regulated load current $I_{L3}$), regulate the power delivered to the first load 242 as a CV1 output (i.e., regulated output voltage $V_{O1}$), and regulate the power delivered to the second load 238 as a CV2 output (i.e., regulated output voltage $V_{O2}$).

Although the embodiment of FIG. 2B is configured to provide a CC output to LED strings 283-284 and to provide CV1 and CV2 outputs, other configurations having greater or fewer than one CC output and greater or fewer than two CV outputs (i.e., CV1 and CV2 outputs) are possible.

The secondary switches block 104 includes diodes 220, 221 and secondary switches 222, 225, 228. The diode 220 is electrically coupled between the secondary winding 218 and the multiple parallel connected LED strings 283-284 to receive the secondary voltage $V_{SEC3}$ and to provide the secondary current $I_{S3}$ to the CC output. The diode 221 and secondary switch 222 are electrically coupled between the secondary winding 216 and the second load 238 to provide the CV2 output; and the secondary switch 225 is electrically coupled between the secondary winding 214 and the first load 242 to provide the CV1 output. As illustrated, the CC output may have a highest voltage output (i.e., output voltage $V_{O3}$) with regulated load current $I_{L3}$. The CV2 output may be a regulated intermediate voltage (i.e., output voltage $V_{O2}$) with load current $I_{L2}$; and the CV1 output may be a regulated voltage (i.e., output voltage $V_{O1}$) with load current $I_{L1}$.

Also as illustrated, the secondary switches 222, 225, 228 can be bidirectional switches allowing current to flow in two directions. For instance, secondary switch 228 has a gated switch 229, gated by control signal Vcr, and has a diode 230. Secondary switch 225 has a gated switch 226, gated by control signal $V_{C1}$, and has a diode 227; and secondary switch 222 has a gated switch 223, gated by control signal $V_{C2}$, and has a diode 224. As will be discussed below with regards to FIG. 2C, secondary switches 222, 225, and 228 can be realized with FETs.

The system control module 108 includes a slave subsystem block 250 and a master subsystem block 260. The slave subsystem block 250 includes the primary switch 152, a primary control block 254, and a secondary control block 256. The master subsystem block 260 includes a master control module 262, the CCM bypass control block 153, and a load control circuit 264.

The slave subsystem block 250 and the master subsystem block 260 may be electrically coupled to send and receive master-to-slave signals 251 for communicating information between the master subsystem block 260 and the slave subsystem block 250. For instance, the master-to-slave signals 251 may be used to communicate start-up and/or steady-state control information between the master subsystem block 260 and the slave subsystem block 250. The control information can include information relating to switching mode (e.g., CCM and/or DCM). Also, during start-up, the master-to-slave signals 251 may be used to communicate a condition from the master subsystem block 260 to the slave subsystem block 250 so that the secondary control block 256 can send a "handshake signal" to the primary control block 254 via a coupling signal REQ.

During operation in DCM mode and/or in CCM mode, pulse width modulated (PWM) control of the primary switch 152 allows energy to transfer from the primary winding 212 to the secondary windings 214, 216, 218. The primary control block 254 can provide a primary control signal $V_{CS}$ to gate (i.e., switch) the primary switch 152 with a pulse width modulated (PWM) signal. Also, the clamp 110 can be used to clamp the peak value of switch voltage $V_{SW}$ during switching cycles.

The secondary control block 256 can provide a gate control signal Vcr to secondary switch 228 to control current flow from the secondary ground RTN through the secondary windings 214, 216, 218. The secondary return potential SRTN can be provided via a resistor Rw to the secondary control block 256; this may avail a forward pin signal Vfwd for determining a switching state of the primary switch 152 and/or a switching mode (i.e., CCM and/or DCM). For instance, the secondary control block 256 may monitor a characteristic (e.g., ringing, duty cycle, amplitude, and/or period) of the forward pin signal Vfwd to determine switching mode (i.e., CCM and/or DCM). Alternatively and additionally, the secondary control block 256 may provide a gate control signal Vcr in response to the forward pin signal Vfwd relative to a threshold value (e.g., negative two millivolts). The gate control signal Vcr may be provided such that the secondary switch 228 turns on and off in response to the forward pin signal Vfwd reducing below and exceeding the threshold value, respectively.

As illustrated the master subsystem block 260 may communicate with the secondary switches block 104 in response to the load feedback signals 107 and may provide control signals $V_{C1}$ and $V_{C2}$ to control secondary switch 225 and secondary switch 222, respectively. In some embodiments the master control module 262 may use load feedback signals 107 including Vfb1, Vfb2, and/or Vfb3 to provide regulation to the multiple loads 106. For instance, control signal $V_{C1}$ can be used to provide gating signals to secondary switch 225 to regulate the output voltage $V_{O1}$ (i.e., the CV1 output); and control signal $V_{C2}$ can be used to provide gating signals to secondary switch 222 to regulate the output voltage $V_{O1}$ (i.e., the CV2 output). Additionally, the load control circuit 264 may be used to control the load current $I_{L3}$ (i.e., the CC output) by controlling the LED string currents $I_{S3A}$ and $I_{S3B}$.

As discussed above, problems can arise when operating (i.e., switching) in CCM. In the teachings herein additional circuit and control features within the master subsystem block 260 can be used to mitigate reverse recovery in diode 220. For instance, the master subsystem block 260 may include the CCM bypass control block 153 to divert (i.e., bypass) secondary current $I_{S3}$ in diode 220. During a CCM switching cycle, the CCM bypass control block 153 may provide control signal $V_{C1}$ and/or control signal $V_{C2}$ to turn on one or more of the secondary switches 222 and 225. By turning on one or both of the secondary switches 222 and 225, a parallel path (e.g., one or both of parallel paths 271, 272) with diode 220 allows one or more of secondary currents $I_{S1}$ and $I_{S2}$ to divert (i.e., bypass) the diode current (i.e., the secondary current $I_{S3}$).

Figure 2C:
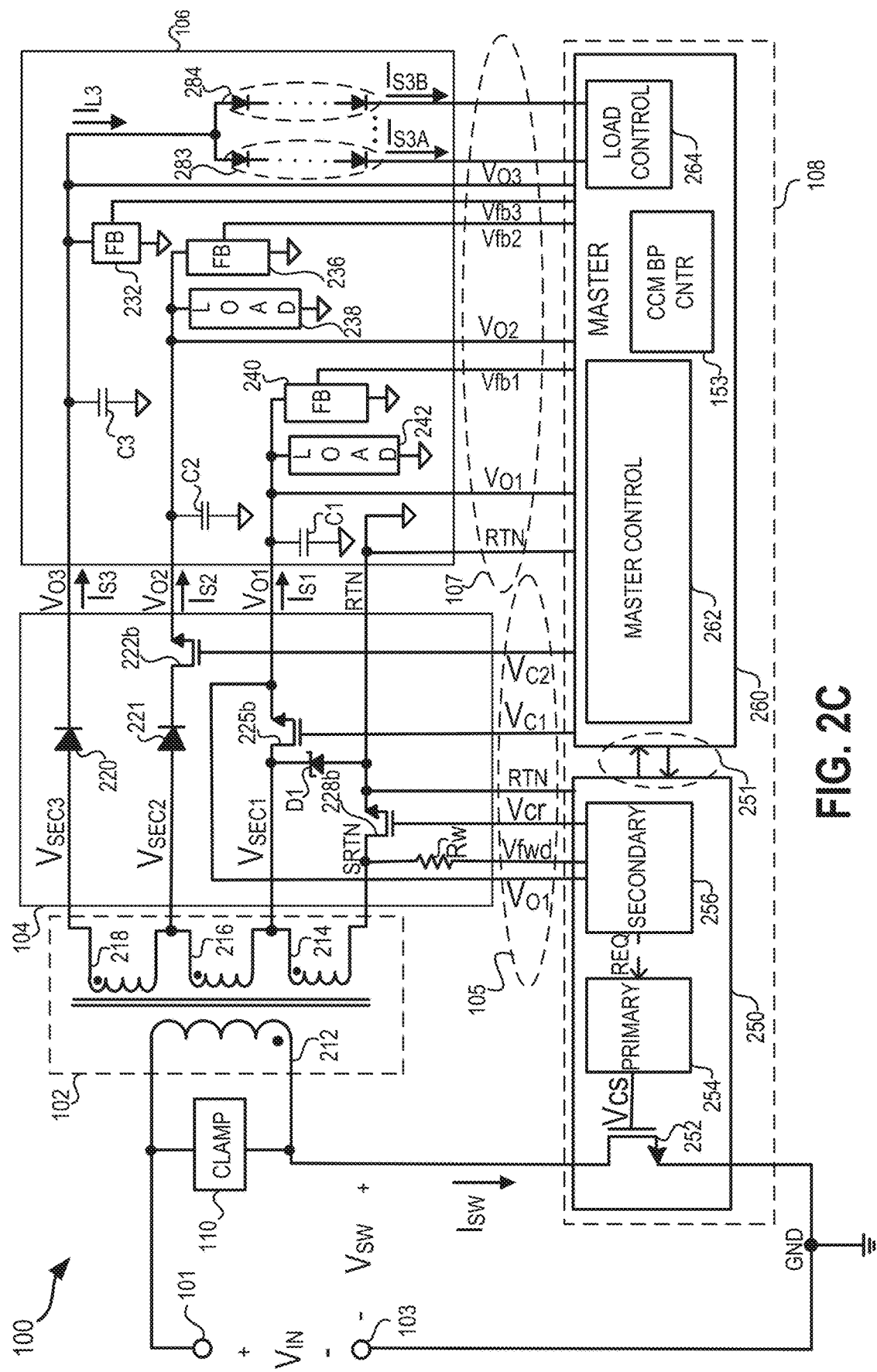
FIG. 2C illustrates a realization of the system level diagram of FIG. 2B using field effect transistors (FETs).

FIG. 2C illustrates a realization of the system level diagram of FIG. 2B using field effect transistors (FETs). The secondary switches 222, 225, 228 can be realized with N-channel FETs 222b, 225b, 228b, respectively; and internal body diodes within FETs 222b, 225b, 228b can operate as the diodes 224, 227, 230, respectively. Additionally, Zener diode D1 can clamp the secondary voltage $V_{SEC1}$ and prevent the output voltage $V_{O1}$ from exceeding a Zener voltage. Also as shown, the primary switch 152 may be realized with an N-channel FET 252. The secondary switch signals 105 may also include the output voltage $V_{O1}$, the forward pin signal Vfwd, the control signals Vcr, $V_{C1}$, $V_{C2}$, and the secondary ground RTN; and the load feedback signals 107 may include the secondary ground RTN, the output voltages $V_{O1}$, $V_{O2}$, $V_{O3}$, the feedback signals Vfb1, Vfb2, Vfb3, and the LED string currents $I_{S3A}$, $I_{S3B}$. Additionally, the secondary ground RTN and the multiple output voltages $V_{O1}$, $V_{O2}$, $V_{O3}$ may provide power to the secondary control block 256 and the master subsystem block 260.

Although, the embodiment of FIG. 2C shows a realization of the multi-output power converter system 100 using N-channel FETs 222b, 225b, 228b, and 252 to realize secondary switches 222, 225, 228 and primary switch 152, respectively, other configurations are possible. As one of ordinary skill in the art can appreciate, switches may be realized using integrated and/or discrete semiconductor components including insulated gate bipolar transistors (IGBTs) and/or opposite polarity FETs (e.g., P-channel FETs); and active devices may be realized using material processes based on silicon, silicon germanium, gallium arsenide, and the like. Also, although the multiple loads 106 are shown as having two LED strings 283, 284, loads using greater or fewer than two LED strings 283, 284 are possible.

Figure 3A:
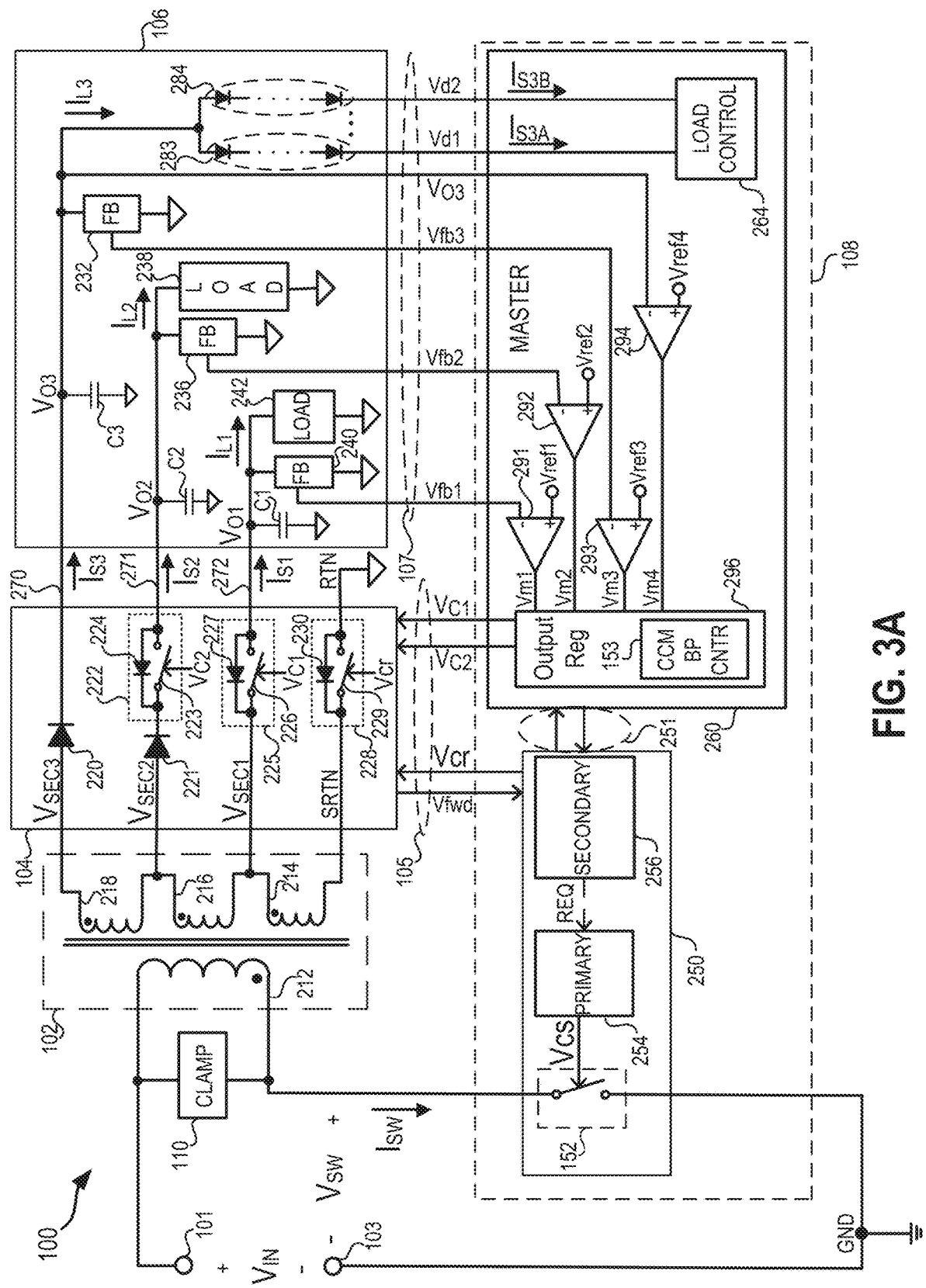
FIG. 3A illustrates a detailed block diagram of a multi-output power converter system for providing regulated power to CC and CV outputs according to an embodiment.

FIG. 3A illustrates a detailed block diagram of a multi-output power converter system 100 for providing regulated power to CC and CV outputs according to an embodiment. FIG. 3A shows an embodiment of the master subsystem block 260 with control loops for regulating the CV1, CV2, and CC outputs. The master subsystem block 260 includes the load control circuit 264, comparators 291-294, and an output regulator block 296; and the output regulator block 296 includes the CCM bypass control block 153.

During operation, comparators 291-293 may respectively compare feedback signals Vfb1-Vfb3 with reference signals Vref1-Vref3 to provide control signals Vm1-Vm3 to the output regulator block 296. In some embodiments the master-to-slave signals 251 may communicate information available from the output regulator block 296 for closed loop and open loop control of the CC and CV outputs (e.g., output voltages $V_{O1}$-$V_{O3}$). The output regulator block 296 may also provide control signals $V_{C1}$ and $V_{C2}$ based in part on the state of the comparators 291-293.

Also during operation and start-up transient operation, comparator 294 may provide a wake-up feature for the highest voltage output (i.e., output voltage $V_{O3}$) by comparing output voltage $V_{O3}$ with a reference Vref4. For instance, comparator 294 may provide control signal Vm4 to the output regulator block 296 to signal a "power good" condition. A "power good" condition may be indicative of when the output voltage $V_{O3}$ has reached a "good" value to drive a load (i.e., to drive the two LED strings 283, 284).

According to the teachings herein, the system control module 108 may be configured to recognize when the multi-output power converter 100 operates in CCM and to substantially reduce and or eliminate diode reverse recovery current (e.g., reverse recovery current in diode 220). For instance, the slave subsystem block 250 and/or the secondary control block 256 may monitor the forward pin signal Vfwd and, based on a characteristic (e.g., a ringing characteristic and/or idle ring condition), determine CCM and/or DCM.

In response to determining CCM, the system control module 108 may select (i.e., control) one or more of the switches of the secondary switches block 104 to provide a parallel path with diode 220. For instance, during a switching cycle in CCM (i.e., a CCM switching cycle) while diode 220 conducts secondary current $I_{S3}$, comparator 291 may provide control signal Vm1 indicating that the first load 242 demands more power (e.g., that feedback signal Vfb1 reduces below reference signal Vref1). In response, control signal $V_{C1}$ may be provided to close (i.e., to select) secondary switch 225 during a portion of the CCM switching cycle. In this way some and/or substantially all of the diode current (i.e., the secondary current $I_{S3}$) may be reduced; accordingly, some and/or all of the diode reverse recovery current in diode 220 may be reduced and/or eliminated.

Alternatively, and additionally, during a switching cycle in CCM while diode 220 conducts current, comparator 292 may provide control signal Vm2 indicating that the second load 238 demands more power (e.g., feedback signal Vfb2 reduces below reference signal Vref2). In response, control signal $V_{C2}$ may be provided to close secondary switch 222 during a portion of the CCM switching cycle to bypass (i.e., divert) some and/or all of the diode current (i.e., the secondary current $I_{S3}$).

As one of ordinary skill in the art can appreciate, the CCM bypass control block 153 and the control loops of the master subsystem block 260 may be realized using other mixed signal and/or analog circuits; accordingly, the realization shown by the master subsystem block 260 is not a limiting embodiment. For instance, in some configurations control loops could be realized using analog to digital converters (ADCs); and the feedback signals Vfb1-Vfb3 could be compared with reference signals Vref1-Vref3 in the digital domain. Also, the reference signals Vref1-Vref3 could be digitally created and compared with a digital representation of the feedback signals Vfb1-Vfb3. In other embodiments the CCM bypass control block 153 may be implemented using additional hardware and/or circuits.

Figure 3B:
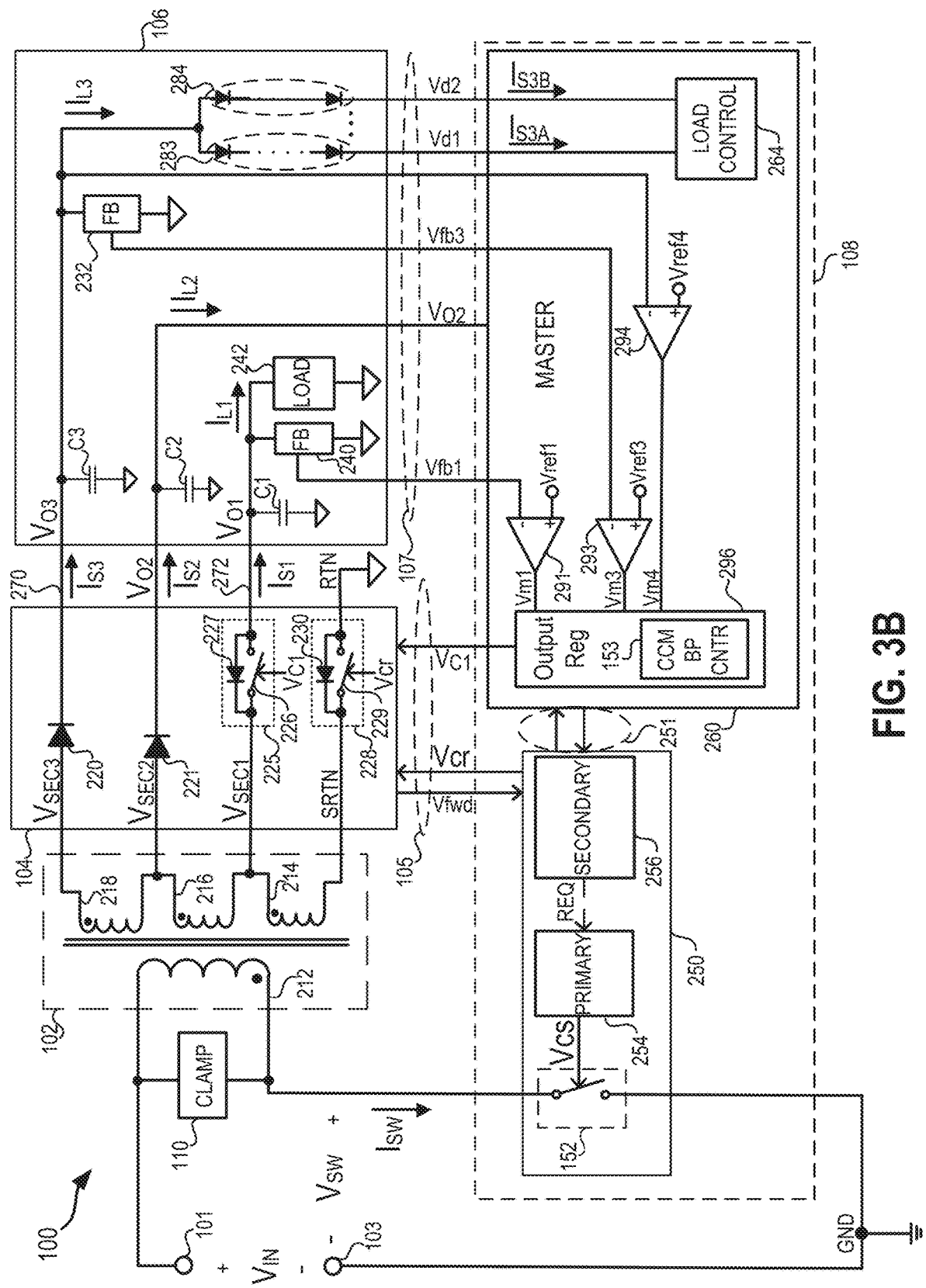
FIG. 3B illustrates a detailed block diagram of a multi-output power converter system for providing regulated power to CC and CV outputs according to another embodiment.

FIG. 3B illustrates a detailed block diagram of a multi-output power converter system 100 for providing regulated power to CC and CV outputs according to another embodiment. The multi-output power converter system 100 of FIG. 3B is similar to the multi-output power converter system 100 of FIG. 3A except it does not provide a regulated CV2 output to a load 238. Instead, the output voltage $V_{O2}$ is unregulated and provides an unregulated voltage to the master subsystem block 260. The output voltage $V_{O2}$ may be used within the master subsystem block 260 as an auxiliary unregulated supply voltage without a control loop, without comparator 292, and without secondary switch 222.

As illustrated, diode 220 may conduct secondary currents $I_{S3}$ and diode 221 may conduct secondary current $I_{S2}$. In response to determining CCM, the system control module 108 may select (i.e., control) secondary switch 225 of the secondary switches block 104 to provide a parallel path 272. During a switching cycle in CCM (i.e., a CCM switching cycle) while diode 220 and/or diode 221 conducts current (i.e., secondary current $I_{S3}$ and/or secondary current $I_{S2}$), control signal $V_{C1}$ may be provided to close (i.e., to select) secondary switch 225 during a portion of the CCM switching cycle. In this way some and/or substantially all of the diode current (i.e., secondary current $I_{S3}$ and/or secondary current $I_{S2}$) may be diverted (i.e., bypassed).

Although the multi-output power converter system 100 of FIG. 3A shows a configuration for providing and controlling power delivered to the multiple loads 106 as a CC output to the LED strings 283, 284, as a CV1 output to the load 242, and as a CV2 output to the load 238, other configurations are possible. In some configurations, such as the configuration shown in FIG. 3B, a load may not require regulation. Alternatively, and additionally, some applications may have fewer or greater CC and/or CV regulated loads. For instance, FIG. 3C illustrates a power converter system 100 having CV outputs.

Figure 3C:
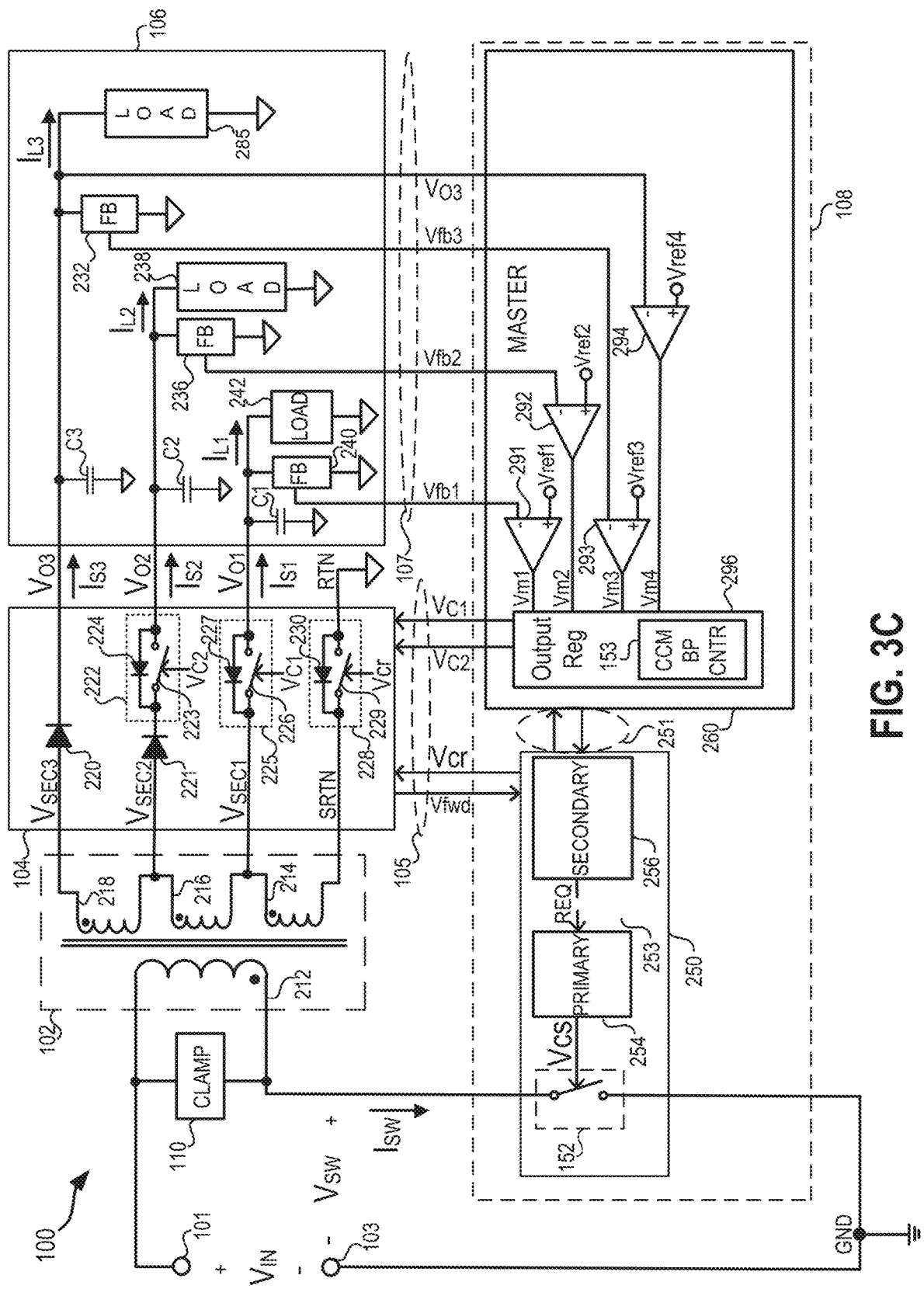
FIG. 3C illustrates a detailed block diagram of a multi-output power converter system for providing regulated power to CV outputs according to an embodiment.

FIG. 3C illustrates a detailed block diagram of a multi-output power converter system 100 for providing regulated power to CV outputs according to an embodiment. The multi-output power converter system 100 of FIG. 3C is similar to the multi-output power converter system 100 of FIG. 3A except it does not provide a CC output to LED strings 283, 284. Instead, the output voltage $V_{O3}$ is regulated so that power may be delivered to a load 285 as a CV output (i.e., a CV3 output).

Figure 4:
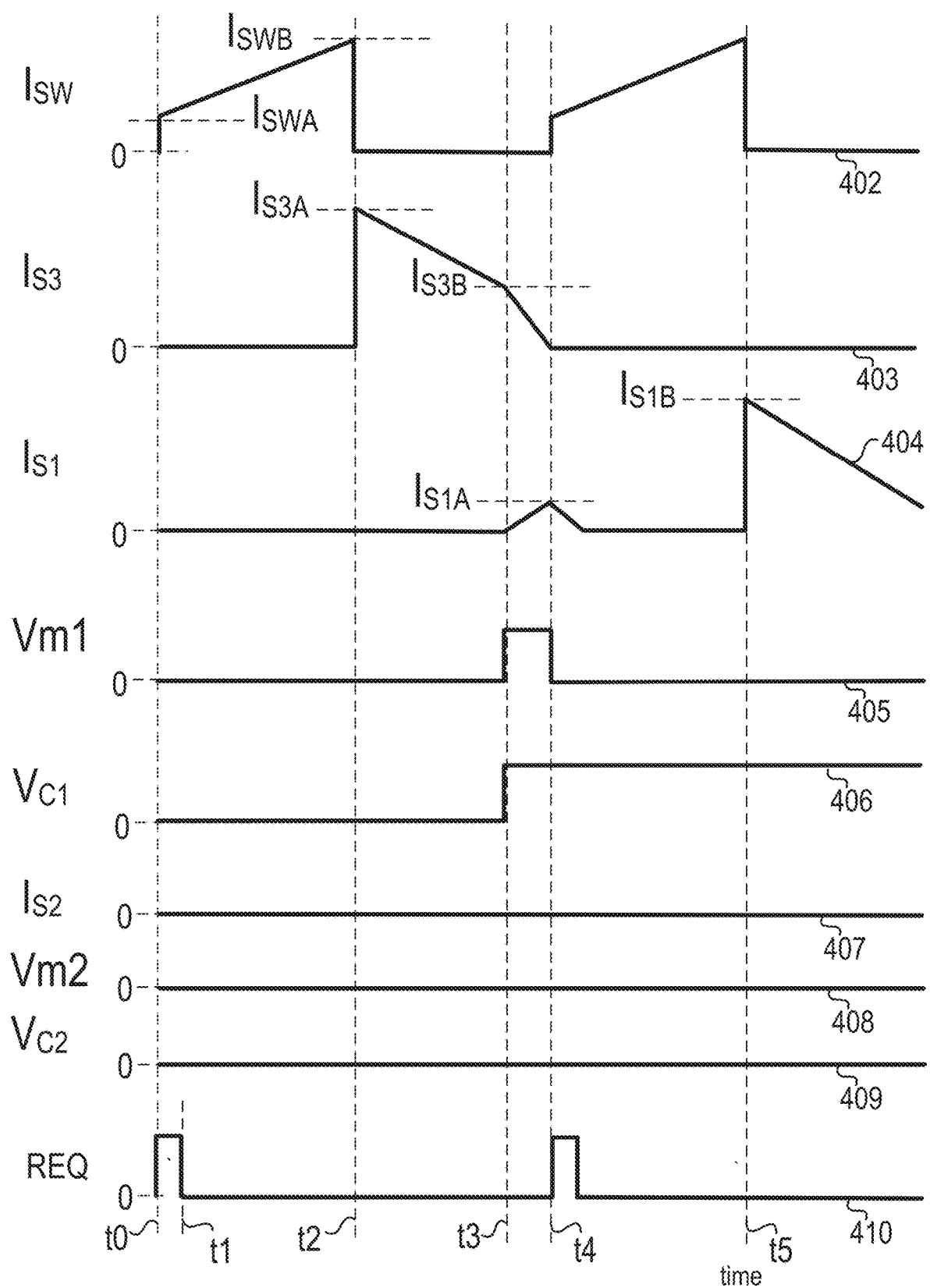
FIG. 4 illustrates waveforms during switching cycles according to the teachings herein.

FIG. 4 illustrates waveforms 402-410 during switching cycles according to the teachings herein. Waveforms 402, 403, 404, and 407 may respectively correspond with primary current $I_{SW}$, secondary current $I_{S3}$, secondary current $I_{S1}$, and secondary current $I_{S2}$ in units of current (e.g., amps) versus time; waveforms 405, 406, 408, 409, and 410 may respectively correspond with control signal Vm1, control signal $V_{C1}$, control signal Vm2, control signal $V_{C2}$, and the coupling signal REQ in units of voltage (e.g., volts).

The time period from time t0 to time t4 may be representative of a CCM switching cycle whereby during the period (i.e., switching period) from time t0 to time t4 the multi-output power converter system 100 operates in CCM. Additionally, during the CCM switching cycle from time t0 to time t4, the diode 220 may conduct secondary current $I_{S3}$. At time t0 the coupling signal REQ (i.e., waveform 410) may provide a pulse (i.e., a pulse lasting from time t0 to time t1). In response, the primary switch 152 may close (i.e., turn on) and conduct primary current $I_{SW}$ in the primary winding 212. In this regard, the primary switch may energize the primary winding 212. Accordingly, the primary current $I_{SW}$ transitions from substantially zero to a first current value $I_{SWA}$ (e.g., to 500 milliamps) at time t0 and increases to a second current value $I_{SWB}$ (e.g., to 3 amps) at time t2. Also, as illustrated from time t0 to time t2, the secondary currents $I_{S1}$, $I_{S2}$, $I_{S3}$ (i.e., waveforms 404, 407, 403) can be substantially zero, indicative of the primary switch 152 being closed; and the control signals $V_{C1}$, $V_{C2}$, Vm1, Vm2 (i.e., waveforms 406, 409, 405, 408) may be substantially zero indicating that the loads (e.g., loads 242, 238 at the CV2, CV1 outputs) may be in regulation and/or not demanding power.

At time t2 the primary switch 152 may open (i.e., turn off) and energy (i.e., power) may transfer from primary winding 212 to the secondary winding 218. Accordingly, at time t2 waveform 402 (i.e., primary current $I_{SW}$) transitions to substantially zero and waveform 403 (i.e., secondary current $I_{S3}$) increases to a peak current value $I_{S3A}$ (e.g, to 10 amps).

During the time period from time t2 to time t3, diode 220 may conduct the secondary current $I_{S3}$ according to waveform 403. As illustrated waveform 403 decreases from the peak current value $I_{S3A}$ at time t2 to a residual current value $I_{S3B}$ (e.g, to 1 amp) at time t3. According to mathematics, waveform 403 may be characterized as having a slope (i.e., a time derivative of waveform 403) between times t2 and t3; and the magnitude of the slope between times t2 and t3 may be indicative of a current decay rate. During the CCM switching cycle a diverting current (e.g., secondary current $I_{S1}$ and/or $I_{S2}$) may be used to bypass some and/or substantially all of the secondary current $I_{S3}$ in diode 220. For instance, at time t3 control signal Vm1 (i.e., waveform 405) may transition high and indicate that the load 242 of the CV1 output (i.e., output voltage $V_{O1}$) demands power. In response, the control signal $V_{C1}$ (i.e., waveform 406) may transition high to turn on (i.e., to select) secondary switch 225 in the secondary switches block 104. Additionally, the CCM bypass control block 153 may effectuate the transition (i.e., rising edge) of waveform 406 from low to high at time t3.

From time t3 to time t4, secondary switch 225 may conduct secondary current Isi according to waveform 404. As illustrated, secondary current $I_{S1}$ (i.e., waveform 404) increases from substantially zero at time t3 to a peak diverting value $I_{S1A}$ (e.g, to 2 amps) at time t4. Concurrently, secondary current $I_{S3}$ (i.e., waveform 403) decreases from the residual current value $I_{S3B}$ at time t3 to substantially zero at time t4 with a steeper slope (i.e., steeper time derivative). As illustrated by waveform 403, a rate of current decay between times t3 and t4 can be greater (i.e., steeper) than the rate of current decay between times t3 and t4.

From time t3 to time t4 secondary current $I_{S1}$ conducts through secondary switch 225 (i.e., a parallel path) concurrently while secondary current $I_{S3}$ conducts in diode 220. In this way secondary current $I_{S1}$ may be a diverting current to bypass some and/or all of secondary current $I_{S3}$. Advantageously, secondary current $I_{S3}$ substantially reaches zero at time t4 before the primary switch 152 again turns on (i.e., closes) at time t4. In this way, a stored charge of the diode may be substantially zero at time t4, and diode reverse recovery current in diode 220 may be substantially mitigated (i.e., reduced and/or eliminated).

Also, as illustrated at time t4, the secondary control block 256 may again provide the coupling signal REQ (i.e., waveform 410). In response the primary switch 152 may again turn on to initiate a subsequent switching cycle. During the subsequent switching cycle beginning at time t4, control signal $V_{C1}$ (i.e., waveform 406) may remain high so that power transfers to the CV1 output and the first load 242. For instance, at time t5 when the primary switch 152 turns off (i.e., when the primary current reduces to substantially zero), power may transfers to the CV1 output such that waveform 404 transitions from substantially zero to a peak current $I_{S1B}$.

Although, waveforms 402-410 may correspond to CCM switching cycles whereby control signal $V_{C1}$ transitions at time t3, other waveforms are possible. For instance, another load configuration may exist whereby at time t3, the second load 238 may demand power and control signal Vm2 (i.e., waveform 408), instead of control signal Vm1 (i.e., waveform 405), transitions high. Accordingly, secondary switch 222, instead of secondary switch 225, may be closed in order to use secondary current $I_{S2}$, instead of secondary current Isi, as a diverting (i.e., bypass) current. Alternatively, and additionally, when a CV1 output and/or CV2 output are in regulation and the first and second loads 242, 238 do not demand power at time t3, then the CCM bypass control block 153 may select either secondary switch 225 or secondary switch 222 to divert diode current (i.e., divert secondary current $I_{S3}$) at time t3.

Also, according to the teachings herein, the time from when a switch (e.g., secondary switch 222 and/or secondary switch 225) is selected (i.e., is turned on) to when the primary switch (e.g., primary switch 152) turns on may be referred to as a "cross over time". For instance, during the CCM switching cycle from time t0 to time t4, the portion (i.e., interval) of the cycle from time t3 to time t4 may be referred to as the "cross over time". In some embodiments the cross over time may be controlled to have a value between one percent and twenty-five percent of the CCM switching cycle. For instance, in one embodiment a time period from time t0 to time t4 can be between 7.7 microseconds (μs) and 20 μs corresponding with a cycle frequency between 130 kilohertz (kHz) and 50 kHz; and a corresponding cross over time may be between three hundred nanoseconds and two microseconds.

Figure 5A:
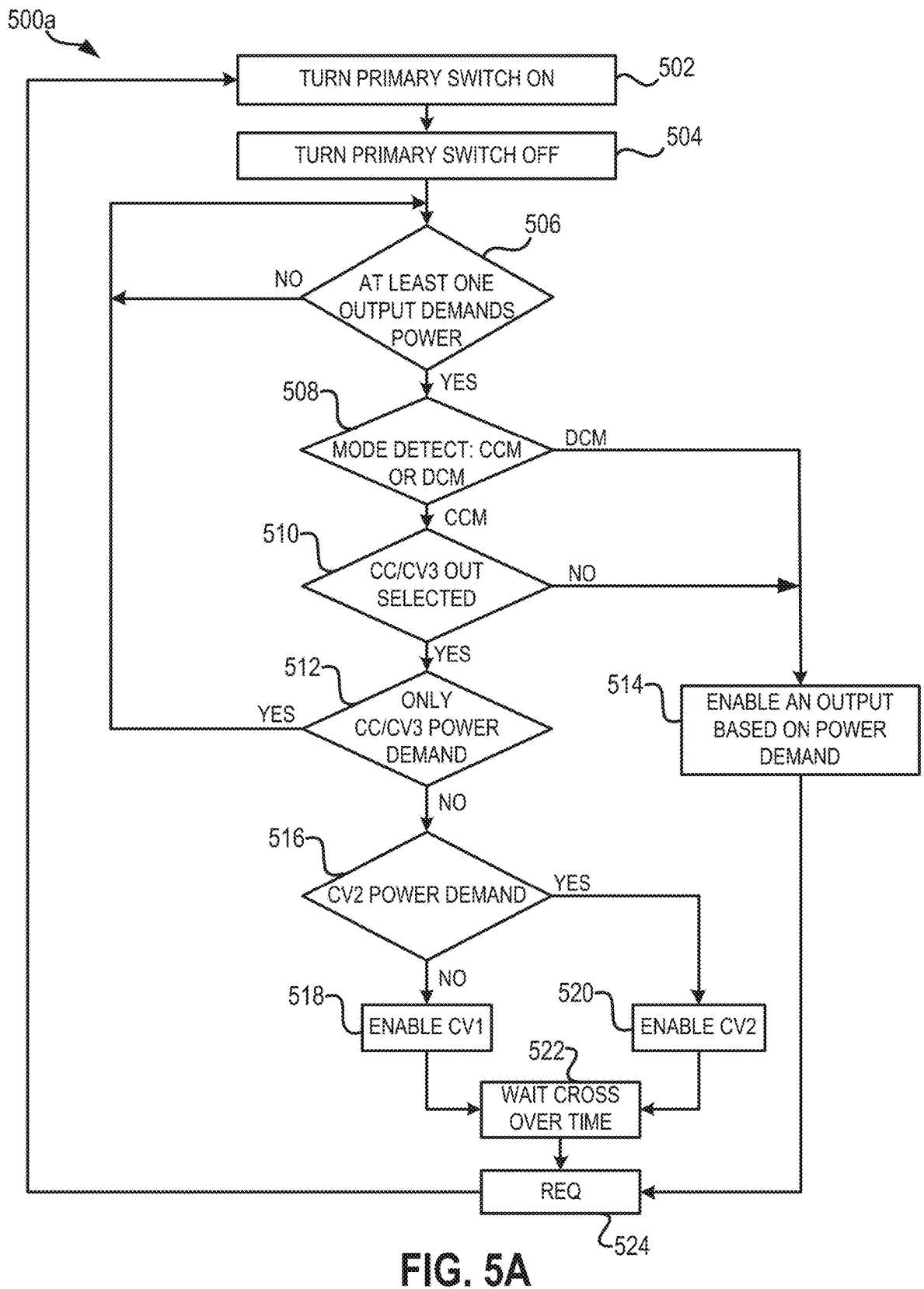
FIG. 5A illustrates a flow chart for controlling multiple outputs during a switching cycle of a multi-output power converter system according to an embodiment.

FIG. 5A illustrates a flow chart 500a for controlling multiple outputs during a switching cycle of a multi-output power converter system 100 according to an embodiment. Step 502 may refer to turning on (i.e., closing) the primary switch 152 to conduct primary current $I_{SW}$ in the primary winding 212. For instance, in response to a pulse of the coupling signal REQ, the primary control block 254 may provide a primary control signal $V_{CS}$ to gate (i.e., to close) the primary switch 152. Step 504 may correspond to subsequently turning off (i.e., opening) the primary switch 152 so that energy can transfer from the primary winding 212 to one or more of the secondary windings 214, 215, 218.

The following decision step 506 may correspond to a control decision whereby the system control module 108 determines that one or more of the CC and/or CV outputs (e.g., the CV1, CV2, and/or CC/CV3 output) demands power. With reference to FIG. 3A, the system control module 108 may use the master subsystem block 260 in deciding power demand. Power demand may depend, at least in part, upon a loading condition of one or more of the loads (e.g., LED strings 283, 284, load 238, and/or load 242). For instance, comparator 293 may provide control signal Vm3 indicating that the feedback signal Vfb3 has reduced below the reference signal Vref3; the load control circuit 264 may also indicate a need to provide additional power (e.g., additional load current $I_{L3}$) to the LED strings 283, 284. Alternatively, and additionally, comparator 292 may provide control signal Vm2 indicating that the CV2 output demands power (e.g., that the feedback signal Vfb2 has reduced below the reference signal Vref2); and comparator 291 may provide control signal Vm1 indicating that the CV1 output demands power (e.g., that the feedback signal Vfb1 has reduced below the reference signal Vref1).

Upon determining that at least one of the CC and/or CV outputs demands power, the next step is decision step 508. Decision step 508 may correspond to determining mode, CCM or DCM. As discussed above, CCM or DCM may be determined, at least in part, based upon a measurement and/or sampling of the forward pin signal Vfwd. Again with reference to FIG. 3A, the slave subsystem block 250 and/or the secondary control block 256 may receive the forward pin signal Vfwd, and based upon a characteristic and/or condition (e.g., ringing characteristic and/or idle ring condition), determine mode (i.e., CCM or DCM). In response, the slave subsystem block 250 may communicate the mode (i.e., CCM or DCM) to the master subsystem block 260 via one or more of the master-to-slave signals 251.

If during decision step 508, the system control module 108 (e.g., the slave subsystem block 250) has determined the multi-output power converter system 100 is operating in DCM, then the next step is step 514.

Step 514 may correspond with DCM mode operation, and power may be provided to a CC and/or CV output (e.g., the CV1, CV2, and/or CC/CV3 output) based on load demand. For instance, with reference to FIG. 3A, if control signal Vm3 indicates that the feedback signal Vfb3 has reduced below the reference signal Vref3, then the output regulator block 296 may provide control signals $V_{C1}$, $V_{C2}$ so that power (i.e., secondary current $I_{S3}$) flows to the CC output and provides load current $I_{L3}$ to the LED strings 283, 284. Accordingly, control signals $V_{C1}$, $V_{C2}$ may be provided so that secondary switches 222, 225 are open (i.e., turned off). If on the other hand control signal Vm2 indicates that the feedback signal Vfb2 has reduced below the reference signal Vref2, then the output regulator block 296 may provide control signal signals $V_{C1}$, $V_{C2}$ so that power (i.e., secondary current $I_{S2}$) flows to the CV2 output and provides load current $I_{L2}$ to load 238. Accordingly, control signal $V_{C2}$ may be provided so that secondary switch 222 is closed (i.e., turned on) while control signal $V_{C1}$ may be provided so that secondary switch 225 is open (i.e., turned off). Similarly, if control signal Vm1 indicates that the feedback signal Vfb1 has reduced below the reference signal Vref1, then the output regulator block 296 may provide control signal signals $V_{C1}$, $V_{C2}$ so that power (i.e., secondary current $I_{S1}$) flows to the CV1 output and provides load current $I_{L1}$ to load 242. Accordingly, control signal $V_{C1}$ may be provided so that secondary switch 225 is closed (i.e., turned on) while control signal $V_{C2}$ may be provided so that secondary switch 222 is open (i.e., turned off).

Following step 514, step 524 corresponds to providing the coupling signal REQ (e.g., waveform 410) to indicate a request for turning on the primary switch. Accordingly, following step 524, a switching cycle repeats by returning to step 502, turning on (i.e., closing) the primary switch 152.

If during decision step 508, the system control module 108 (e.g., the slave subsystem block 250) determines the multi-output power converter system 100 is operating in CCM, then the next step is decision step 510.

Decision step 510 may correspond with CCM to determine if the CC/CV3 output has been selected. The criterion for the CC/CV3 output being selected may be based, in part, on which output demanded power during decision step 506. If at decision step 506 the CC/CV3 output (e.g., the LED strings 283, 284) demanded power and the CV2 output and the CV1 output did not demand power, then that may satisfy a criterion for selecting the CC/CV3 output. If the CC/CV3 output has not been selected, then as illustrated, the next step is step 514. If the CC/CV3 output has been selected, energy from the primary winding 212 may transfer to the secondary winding 218 so that diode 220 is conducting secondary current $I_{S3}$.

Decision step 512 may correspond with determining if the CV1 output and/or the CV2 output demand power while there is a demand for power at the CC/CV3 output (i.e., while diode 220 is conducting secondary current $I_{S3}$). If at step 512 there is only a demand for power at the CC/CV3 output, then diode 220 may continue to conduct secondary current $I_{S3}$ and the multi-output power converter system 100 may return to decision step 506. In returning to decision step 506 from decision step 512, the multi-output power converter system 100 may return to DCM. If, however, at decision step 512 there is concurrently a demand for power at the CV2 output and/or the CV1 output, then the multi-output power converter system 100 may proceed to decision step 516 to initiate selecting a parallel path through the CV2 output and/or the CV1 output.

At decision step 516 if the CV2 output demands power (e.g., if load 238 demands more load current $I_{L2}$) then the next step can be step 520 corresponding to enabling the CV2 output by selecting secondary switch 222. For instance, with reference to FIG. 3A, during step 520 the CCM bypass control block 153 may, based on control signal Vm2, effectuate the selection of secondary switch 222 so that the control signal $V_{C2}$ closes (i.e., turns on) secondary switch 222. In this way secondary current $I_{S2}$ may be a diverting current to bypass some or all of current $I_{S3}$ in diode 220. Alternatively, if the CV2 output does not demand power, then the next step can be step 518 corresponding to enabling the CV1 output by selecting secondary switch 225. The CV1 output may correspond with a lowest voltage (i.e., output voltage $V_{O1}$) and may be selected by the selection of secondary switch 225. For instance, during step 518 the CCM bypass control block 153 may effectuate the selection of secondary switch 225, as a default after decision step 516, if the CV2 output does not demand power. In this way secondary current Isi may be a diverting current to bypass some or all of current $I_{S3}$ in diode 220.

Step 522 follows step 518 and step 520 to indicate that the diverting current (e.g., secondary current $I_{S1}$ or secondary current $I_{S2}$) may be provided for a duration corresponding to the cross over time. The next step 524 may then initiate a new cycle with a pulse via coupling signal REQ (e.g., the pulse from time t0 to time t1 of waveform 510).

With reference to FIG. 4, the CCM switching cycle between times t0 and t4 may correspond with a sequence which begins with step 502 at time t0 and proceeds to step 504 at time t2. Following time t2 and before time t3 the sequence may follow from decision step 506 at time t2 through decision step 512. At time t3 the system may transition to step 516 where it may be determined that the CV2 output does not demand power. Accordingly, the system continues to step 518 at time t3. Concurrently, the control signals Vm1 and $V_{C1}$ (i.e., waveforms 405 and 406) may transition high in order to select (i.e., to turn on) secondary switch 225. Step 522 may correspond with the cross over time from time t3 to t4. Step 524 and following step 502 may correspond with the rising edge of waveform 410 (i.e., the coupling signal REQ) and with the next turn-on transition of primary switch 152 at time t4.

Figure 5B:
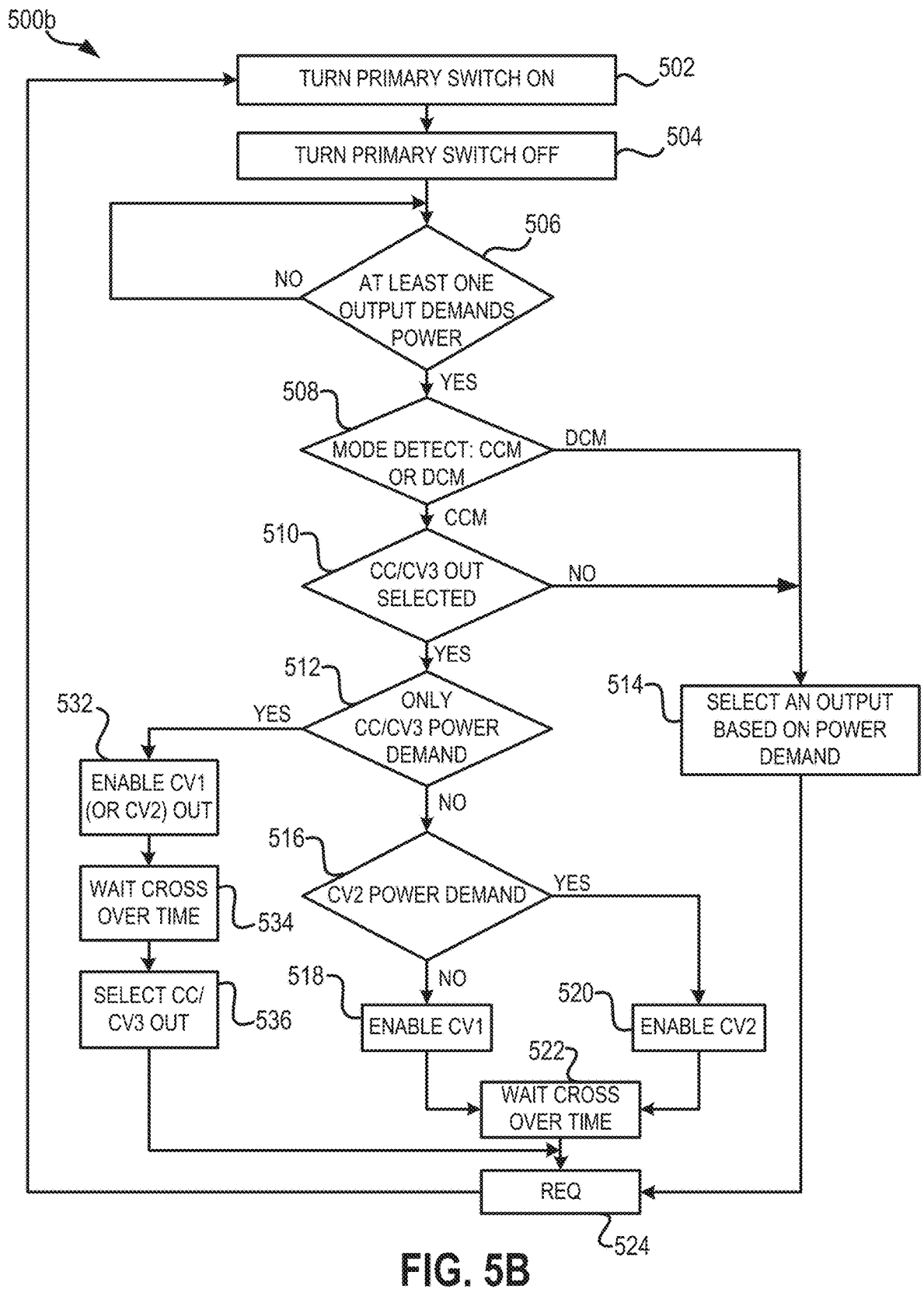
FIG. 5B illustrates a flow chart for controlling multiple outputs during a switching cycle of a multi-output power converter system according to another embodiment.

FIG. 5B illustrates a flow chart 500b for controlling multiple outputs during a switching cycle of a multi-output power converter system 100 according to another embodiment. Flow chart 500b is similar to flow chart 500a except the decision step 512 proceeds with a different sequence when the condition of decision step 512 (i.e., the condition of the CC/CV3 output demanding power) holds true. By comparison to flow chart 500a, instead of returning to step 506, the next step following decision step 512 becomes step 532. At step 532 either the CV1 output or the CV2 output is enabled to provide a diverting current (i.e., secondary current $I_{S1}$ or secondary current $I_{S2}$) via secondary switch 225 or 222, respectively. The next step 534 may corresponds with waiting for a cross over time to allow secondary current $I_{S3}$ in diode 220 to reduce to substantially zero; and the following step 536 may correspond to selecting the CC/CV3 output. Selecting the CC/CV3 output (e.g., the output voltage $V_{O3}$ corresponding with LED strings 283-284) may correspond with deselecting the CV1 and CV2 outputs. For instance, selecting the CC/CV3 output may correspond with opening (i.e., turning off) secondary switch 222 and secondary switch 225.

Although flow charts 500a and 500b include steps and decision steps for three outputs including a CV1, CV2, and CC/CV3 output, other flow charts are possible. For instance, as one of ordinary skill in the art may appreciate, multi-output converter systems having greater or fewer than three outputs are possible; accordingly, corresponding flow charts for greater or fewer than three outputs are also possible.

Figure 6:
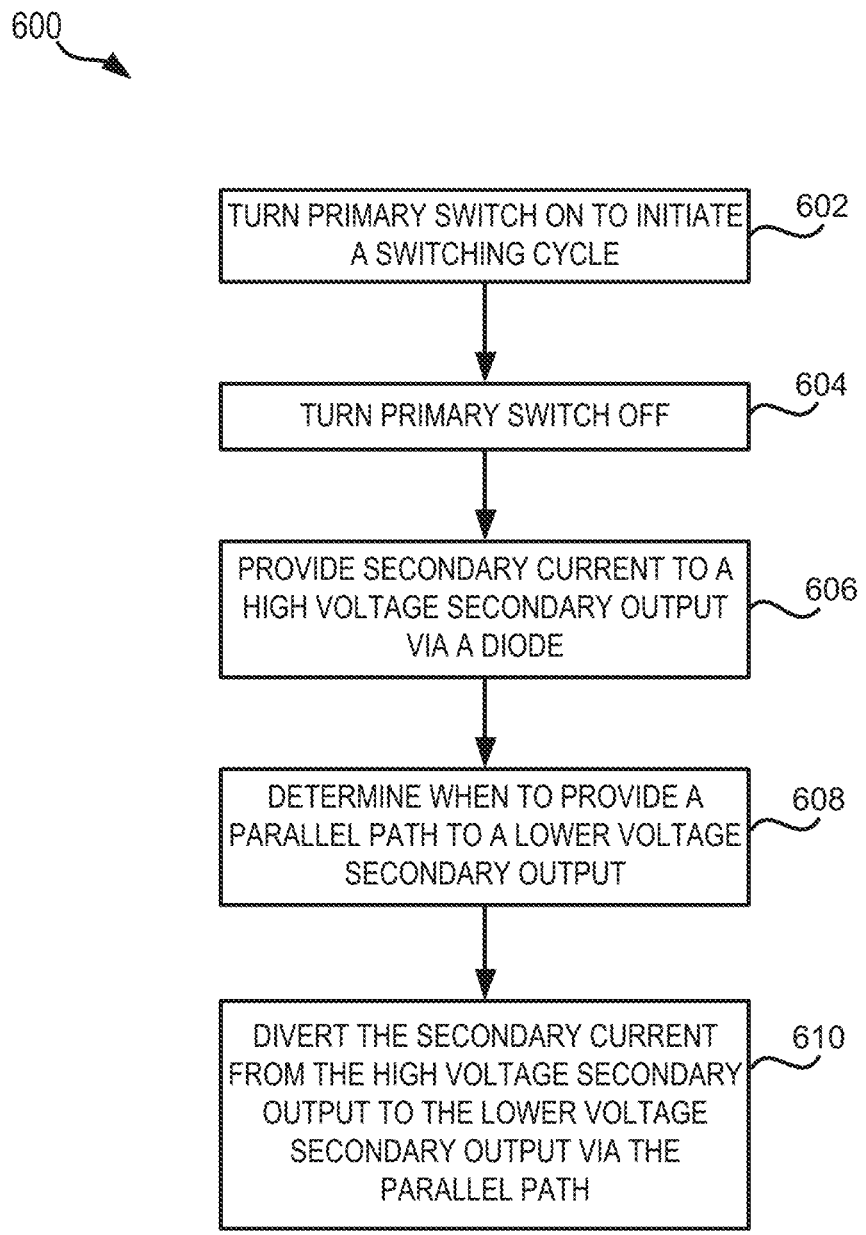
FIG. 6 illustrates a conceptual flow diagram for controlling a multi-output power converter system during a switching cycle according to the teachings herein.

FIG. 6 illustrates a conceptual flow diagram 600 for controlling a multi-output power converter system 100 during a switching cycle according to the teachings herein. Step 602 may correspond to turning on a primary switch (e.g., primary switch 152) to initiate a switching cycle for providing primary current $I_{SW}$ in a primary winding (e.g., primary winding 212). Step 604 may correspond to turning off the primary switch 152 to transfer energy to a secondary winding (e.g., a secondary winding 214, 216, and/or 218).

Step 606 may correspond with providing secondary current to a high voltage (e.g., a highest voltage) secondary output via a diode. For instance step 606 may correspond with providing secondary current $I_{S3}$ to a CC/CV3 output (e.g., output voltage $V_{O3}$) to drive the LED strings 283-284 with load current $I_{L3}$; and diode 220 may conduct the secondary current $I_{S3}$. Step 608 may correspond with determining when to provide a parallel path to a lower voltage secondary output. For instance, step 608 may include measuring the forward pin signal Vfwd in order to determine mode, CCM or DCM; and the forward pin signal Vfwd can be a secondary winding voltage derived from a secondary winding (e.g., secondary winding 214). Step 608 may additionally include decision steps (e.g., decision step 516) to determine if a CV2 output and/or a CV1 output may be selected. A CV2 output and/or a CV1 output may be selected by providing a control signal (e.g., control signal $V_{C2}$ and/or $V_{C1}$) to turn on (i.e., to select) a secondary switch (e.g., secondary switch 222 and/or secondary switch 225).

According to the teachings herein, step 610 may correspond to diverting the diode current (e.g., the secondary current $I_{S3}$) with a diverting current (e.g., secondary current $I_{S2}$ and/or $I_{S1}$). For example, with reference to FIG. 4 and waveforms 402-410, step 602 may correspond with a cycle (i.e., a CCM switching cycle) turning on a primary switch 152 at time t0. Step 604 may correspond with turning off the primary switch 152 at time t2. Step 606 may correspond with providing secondary current $I_{S3}$ beginning at time t2; and diode 220 may conduct secondary current $I_{S3}$. Steps 608 and 610 may correspond with turning on (i.e., selecting) secondary switch 225 when control signals Vm1 and $V_{C1}$ transition high at time t3. Between times t3 and t4, secondary current $I_{S1}$ may divert secondary current $I_{S3}$ from diode 220 to the CV1 output (i.e. to load 242). Advantageously, the diverting current (i.e., secondary current Isi) may reduce the diode current (i.e., secondary current $I_{S3}$ in diode 220) to substantially zero; accordingly during the subsequent cycle beginning at time t4, diode reverse recovery current may be substantially reduced or eliminated.

It is appreciated that in the description and example drawings, the concept of independently controlled CC/CV multiple outputs has been illustrated mostly with series couplings of the secondary windings on the energy transfer element (e.g., transformer). However, it should not be considered as a limitation and it is appreciated that based on the application and the load power requirement on each of multiple outputs, the independently regulated CV/CC outputs may be arranged in any coupling combination of series windings, parallel windings, or both series windings and parallel windings with a common return line for all of the independently controlled and regulated outputs in accordance with the teachings herein.

The proposed converter topology is one example of a single stage multi-output flyback converter targeting applications with multiple independently regulated constant voltage and/or constant current outputs. Example targets for such products may include monitor and television applications, which include a CC controlled output for the parallel strings (e.g., arrays) of backlight LEDs requiring regulated adjustable (e.g., dimming) constant current output with for example a 40-50V voltage drop plus one or more CV controlled outputs for powering logic, universal serial bus (USB), and audio that should satisfy a strict regulation accuracy requirement for each output.

As presented herein, one aspect of the teachings is a method of controlling a multi-output switch-mode power converter system during a switching cycle and comprising: closing a primary switch; opening the primary switch; enabling a second current path; and providing a diverting current. The primary switch may be closed to energize a primary winding of an energy transfer device (e.g., a transformer); and the primary switch may be opened to provide a secondary current to a high voltage secondary output on a first current path (e.g., path 270) via a diode (e.g., diode 270). The second current path (e.g., parallel path 271 and/or parallel path 272) may be parallel with the first current path; and the diverting current may be provided to a lower voltage secondary output on the second current path. The method of controlling the multi-output switch mode converter system switching cycle can be a continuous conduction mode (CCM) switching cycle.

In another aspect a multi-output power converter is configured to provide power to multiple loads. The multi-output power converter can correspond to a multi-output power converter system and comprise: a transformer, a primary switch, a secondary switches block, and a system control module. The transformer (e.g., transformer 102) comprises a primary winding and multiple secondary windings (e.g., multiple series-connected secondary windings 214, 216, 218). The multiple secondary windings has a plurality of secondary outputs (e.g., secondary outputs including secondary winding voltages $V_{SEC1}$-$V_{SEC3}$ relative to a secondary return potential SRTN); and the primary winding is electrically coupled to receive energy from the power supply. The primary switch is electrically coupled to the primary winding and configured to switch according to a switching cycle (e.g., a CCM switching cycle). The secondary switches block is electrically coupled to the plurality of secondary outputs and comprises a plurality of outputs. The plurality of outputs comprises: a high voltage secondary output (e.g., a CC/CV3 output having a highest voltage output $V_{O3}$) and a lower voltage secondary output (e.g., a CV1 output having lowest voltage output $V_{O1}$). The high voltage secondary output is electrically coupled to the multiple secondary windings via a diode (e.g., diode 220). The system control module is configured to divert a secondary current from the high voltage secondary output to the lower voltage secondary output during the switching cycle.

In another aspect a method of controlling current delivered to multiple outputs during continuous conduction mode (CCM) comprises: turning on a primary switch to initiate a first switching cycle; turning off the primary switch; providing a secondary current; determining when to provide a second current path; diverting the secondary current; and turning on the primary switch to initiate a second switching cycle. The secondary current is provided to a high voltage secondary output on a first current path via a diode; and the second current path is parallel to the first current path. The secondary current is diverted from the high voltage secondary output to the lower voltage secondary output on the second current path.

The above description of illustrated examples of the present disclosure, including what is described in the Abstract, are not intended to be exhaustive or to be limitation to the precise forms disclosed. While specific embodiments of, and examples for continuous conduction mode operation of multi-output switch-mode converters and multi-output switch-mode power converter systems are described herein for illustrative purposes, various equivalent modifications are possible without departing from the broader spirit and scope of the present disclosure. Indeed, it is appreciated that the specific example voltages, currents, frequencies, power range values, times, etc., are provided for explanation purposes and that other values may also be employed in other embodiments and examples in accordance with the teachings herein.

What is claimed is:

1. A method of controlling a multi-output switch-mode power converter system during a switching cycle comprising:
    closing a primary switch to energize a primary winding of an energy transfer device;
    opening the primary switch to provide a secondary current to a high voltage secondary output on a first current path via a diode;
    enabling a second current path parallel to the first current path; and
    reducing a reverse recovery current of the diode by providing a diverting current to a lower voltage secondary output on the second current path.

2. The method of claim 1, wherein the switching cycle is a continuous conduction mode (CCM) switching cycle.

3. The method of claim 1, wherein the high voltage secondary output is a constant current (CC) output.

4. The method of claim 1, wherein the high voltage secondary output is a constant voltage (CV) output.

5. The method of claim 1, wherein a voltage of the high voltage secondary output is greater than a voltage of the lower voltage secondary output.

6. The method of claim 1, wherein the lower voltage secondary output is a constant voltage (CV) output.

7. The method of claim 1, wherein the lower voltage secondary output provides an output comprising a voltage between five volts and twenty volts.

8. The method of claim 1, wherein the high voltage secondary output provides an output comprising a voltage between twenty volts and one hundred volts.

9. The method of claim 1, wherein opening the primary switch to provide the secondary current to the high voltage secondary output on the first current path via the diode comprises:
    providing the secondary current to at least one light emitting diode (LED).

10. The method of claim 1, wherein enabling the second current path parallel to the first current path comprises:
closing a secondary switch.

11. The method of claim 1, wherein enabling the second current path parallel to the first current path comprises:
enabling the second current path in response to detecting a mode of operation.

12. The method of claim 11, wherein the mode of operation comprises a continuous conduction mode (CCM).

13. The method of claim 11, wherein enabling the second current path in response to detecting the mode of operation comprises:
measuring a forward pin signal.

14. The method of claim 13, wherein the forward pin signal is a secondary winding voltage.

15. The method of claim 1, wherein reducing the reverse recovery current of the diode by providing the diverting current to the lower voltage secondary output on the second current path comprises:
concurrently providing the secondary current to the high voltage secondary output via the diode while diverting current to the lower voltage secondary output on the second current path.

16. The method of claim 15, wherein reducing the reverse recovery current of the diode by providing the diverting current to the lower voltage secondary output on the second current path comprises:
providing the diverting current to the lower voltage secondary output on the second current path during a cross over time.

17. The method of claim 16, wherein the cross over time is between three hundred nanoseconds and 2 microseconds.

18. A method of controlling current delivered to multiple outputs in a multi-output power converter system during a continuous conduction mode (CCM), wherein the multiple outputs comprises a high voltage secondary output and a lower voltage secondary output, the method comprising:
turning on a primary switch to initiate a first switching cycle;
turning off the primary switch;
providing a secondary current to the high voltage secondary output on a first current path via a diode;
determining when to provide a second current path parallel to the first current path;
reducing a reverse recovery current of the diode by diverting the secondary current from the high voltage secondary output to the lower voltage secondary output on the second current path; and
turning on the primary switch to initiate a second switching cycle.

19. The method of claim 18, wherein the high voltage secondary output is a constant current (CC) output.

20. The method of claim 18, wherein the high voltage secondary output is a constant voltage (CV) output.

21. The method of claim 18, wherein the lower voltage secondary output is a constant voltage (CV) output.

22. The method of claim 18, wherein the high voltage secondary output comprises a voltage greater than a voltage of the lower voltage secondary output.

23. The method of claim 18, wherein determining when to provide the second current path parallel to the first current path comprises:
receiving a feedback signal indicative of the lower voltage secondary output; and
turning on a secondary switch of the second current path in response to the feedback signal.

24. The method of claim 18, wherein reducing the reverse recovery current of the diode by diverting the secondary current from the high voltage secondary output to the lower voltage secondary output on the second current path comprises:
diverting the secondary current from the high voltage secondary output to the lower voltage secondary output during a cross over time.

25. The method of claim 18, wherein reducing the reverse recovery current of the diode by diverting the secondary current from the high voltage secondary output to the lower voltage secondary output on the second current path comprises:
reducing a stored charge of the diode.

26. The method of claim 18, wherein reducing a reverse recovery current of the diode by diverting the secondary current from the high voltage secondary output to the lower voltage secondary output on the second current path comprises:
providing a diverting current to the lower voltage secondary output.

27. The method of claim 26, wherein reducing a reverse recovery current of the diode by diverting the secondary current from the high voltage secondary output to the lower voltage secondary output on the second current path comprises:
concurrently providing the secondary current to the high voltage secondary output via the diode and the diverting current to the lower voltage secondary output on the second current path.

* * * * *